United States Patent
Hande et al.

(10) Patent No.: US 11,671,378 B2
(45) Date of Patent: Jun. 6, 2023

(54) MANAGING END-TO-END DELAY BUDGET FOR WIRELESS COMMUNICATIONS

(71) Applicant: QUALCOMM Incorporated, San Diego, CA (US)

(72) Inventors: Prashanth Haridas Hande, San Diego, CA (US); Ravi Agarwal, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/335,806

(22) Filed: Jun. 1, 2021

(65) Prior Publication Data

US 2022/0386163 A1    Dec. 1, 2022

(51) Int. Cl.
*H04W 28/02* (2009.01)
*H04W 24/08* (2009.01)
*H04W 28/18* (2009.01)
*H04L 47/283* (2022.01)

(52) U.S. Cl.
CPC .......... *H04L 47/283* (2013.01); *H04W 24/08* (2013.01); *H04W 28/0236* (2013.01); *H04W 28/0268* (2013.01); *H04W 28/18* (2013.01)

(58) Field of Classification Search
CPC ............. H04W 24/08; H04W 28/0268; H04W 28/18; H04W 28/0236; H04W 56/0055; H04W 56/004; H04J 3/0682
See application file for complete search history.

(56) References Cited

U.S. PATENT DOCUMENTS

| 2019/0045577 | A1 | 2/2019 | Kim et al. | |
| 2019/0288953 | A1 | 9/2019 | Yavuz et al. | |
| 2019/0364586 | A1* | 11/2019 | Li | H04W 72/1268 |
| 2021/0014178 | A1* | 1/2021 | Xu | H04L 47/283 |
| 2021/0112458 | A1* | 4/2021 | Qiao | H04L 43/087 |
| 2021/0136619 | A1* | 5/2021 | Iwai | H04L 12/28 |
| 2022/0174486 | A1* | 6/2022 | Abhigyan | H04W 12/06 |

OTHER PUBLICATIONS

Afrin et al, "Performance Evaluation of an Adaptive SemiPersistent LTE Packet Scheduler for M2M Communications", IEEE, 2014 (Year: 2014).*

(Continued)

*Primary Examiner* — Omer S Mian
(74) *Attorney, Agent, or Firm* — Holland & Hart LLP

(57) ABSTRACT

Methods, systems, and devices for wireless communications are described. A device may manage an end-to-end delay budget for wireless communications. The communication device may receive semi-static control signaling indicating a packet delay requirement. The communication device may receive dynamic control signaling from a different device indicating a packet delay measurement for one or more of a packet or a group of packets associated with the wireless communication in one or more of a downlink or an uplink. The communication device may adjust a packet delay parameter to compensate a delay for one or more of the downlink or the uplink based on the packet delay requirement and the packet delay measurement, and may communicate in the downlink, the uplink, or both based on the adjusted packet delay parameter.

18 Claims, 12 Drawing Sheets

(56) References Cited

OTHER PUBLICATIONS

Huawei: "E2E Delay Measurement for Qos Monitoring for URLLC", 3GPP Draft, R3-200484, 3GPP TSG-RAN WG3 #107-e, 3rd Generation Partnership Project (3GPP), Mobile Competence Centre, 650, Route Des Lucioles, F-06921, Sophia-Antipolis Cedex, France, vol. RAN WG3, No. E-Meeting, Feb. 24, 2020-Mar. 6, 2020, Feb. 15, 2020 (Feb. 15, 2020), XP051854485, 8 Pages, Retrieved from the Internet: URL:https://ftp.3gpp.org/tsg_ran/WG3_lu/TSGR3_107_e/Docs/R3-200484.zip R3-200484.docx [retrieved on Feb. 15, 2020] section 3.1, p. 1-p. 3, section 3.2, p. 3-p. 4 section 3.3, p. 4-p. 7.

International Search Report and Written Opinion—PCT/US2022/022551—ISA/EPO—dated Jun. 24, 2022 (2103304WO).

\* cited by examiner

MANAGING END-TO-END DELAY BUDGET FOR WIRELESS COMMUNICATIONS

FIELD OF TECHNOLOGY

The following relates to wireless communications, including managing an end-to-end delay budget for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to techniques for managing a packet delay budget (PDB) for wireless communications, and more particularly to managing one or more of an end-to-end downlink packet delay or an end-to-end uplink packet delay. A communication device, such as a base station or a user equipment (UE) may receive or determine packet delay information including one or more of end-to-end downlink requirements or uplink packet delay requirements, as well as packet delay requirements associated with packet delay components not directly controlled by the communication device. The communication device may derive nominal packet delay requirements for packet delay components controlled by the communication device. The communication device may also support packet delay measurements. For example, the communication device may receive packet delay measurement information for a packet or per group of packets associated with one or more of a downlink or an uplink. The communication device may then calculate or recalculate packet delay requirements to compensate for measured loss in other packet delay components. The techniques employed by the described communication device may provide benefits and enhancements to the operation of the communication device, including reduced power consumption, and may promote higher reliability and lower latency wireless communications, among other benefits.

DETAILED DESCRIPTION

Figure 1:
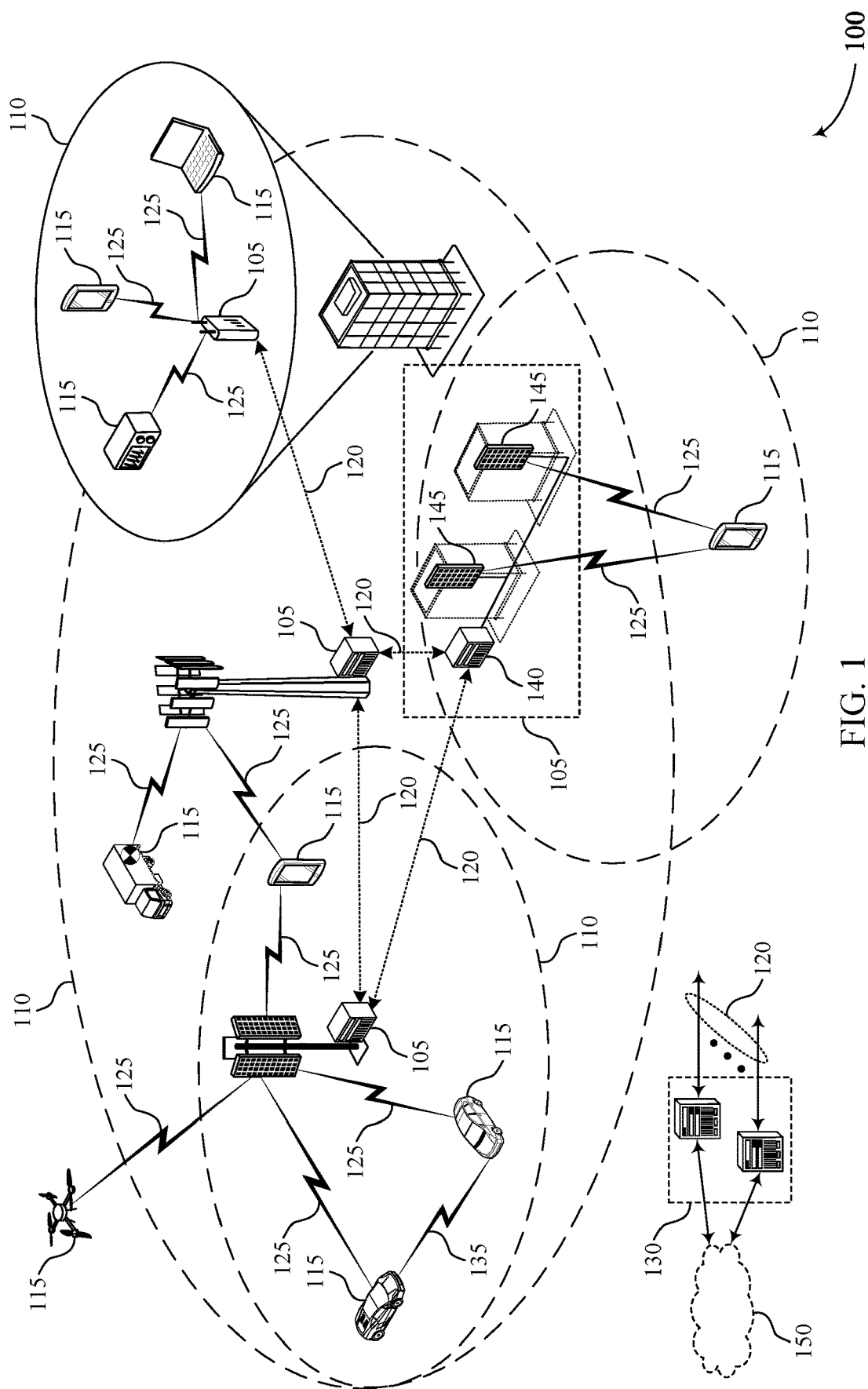
FIGS. 1 through 3 illustrate examples of wireless communications systems that support managing an end-to-end delay budget for wireless communications in accordance with aspects of the present disclosure.

A wireless communications system (e.g., a packet-based network) may include various communication devices, such as a UE and a base station, which may provide services to the UE. The wireless communications system may support multiple radio access technologies including 5G systems, which may be referred to as 5G NR. The UE may communicate with an application client and may transmit to or receive from a server (e.g., an application server) packets associated with an application via the base station, which may communicate with an access network (e.g., a radio access network (RAN)). The RAN may communicate with a user plane function (UPF)) (e.g., over a wired connection) to facilitate exchange of the packets with the application server (e.g., over a dedicated wired connection or using the Internet). The packets may experience a packet delay associated with exchange of the packets between one or more of the UE, the base station, and the core network (e.g., between the application client and the application server). These packet delays may vary over time, and may be due to various factors, such as network congestion, wireless channel variations, among other examples. Additionally or alternatively, the wireless communications system may lack a single packet delay component to ensure an end-to-end delay.

Various aspects of the present disclosure relate to techniques for managing a PDB including one or more of an end-to-end downlink packet delay or an end-to-end uplink packet delay. A communication device (e.g., a delay manager of the communication device), such as a base station or a UE may receive or determine packet delay information including end-to-end downlink requirements or uplink packet delay requirements, as well as packet delay requirements associated with packet delay components not directly controlled by the communication device. The communication device may derive nominal packet delay requirements for packet delay components controlled by the communication device (e.g., via the delay manager). The communication device may also support packet delay measurements. For example, the communication device may receive packet delay measurement information for a packet or per group of packets associated with one or more of a downlink or an uplink. The communication device may then calculate or recalculate packet delay requirements to compensate for measured loss in other packet delay components.

Particular aspects of the subject matter described in the present disclosure may be implemented to realize one or more of the following potential advantages. The techniques employed by the described communication devices may provide benefits and enhancements to the operation of the communication devices, including reduced power consumption, and may promote higher reliability and lower latency wireless communications, among other benefits. For example, a communication device may increase battery life by providing efficient uplink and downlink transmissions in the wireless communications system based on ensuring an end-to-end delay and by informing communication devices of end-to-end delay requirements. Additionally or alternatively, a communication device may promote higher reliability wireless communications by adjusting end-to-end delay requirements based on packet delay measurement information.

Aspects of the disclosure are initially described in the context of wireless communications systems. Aspects of the disclosure are further illustrated by and described with reference to apparatus diagrams, system diagrams, and flowcharts that relate to managing an end-to-end delay budget for wireless communications.

FIG. 1 illustrates an example of a wireless communications system 100 that supports managing an end-to-end delay budget for wireless communications in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a UPF). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In the wireless communications system 100, one or more of a base station 105 or a UE 115 may determine packet delay information, which may include one or more end-to-end downlink requirements or uplink packet delay requirements, as well as packet delay requirements associated with packet delay components not directly controlled by one or more of the base station 105 or the UE 115. In some examples, one or more of the base station 105 or the UE 115 may determine one or more nominal packet delay requirements for packet delay components controlled by one or more of the base station 105 or the UE 115. In some other examples, one or more of the base station 105 or the UE 115 may perform packet delay measurements. For example, one or more of the base station 105 or the UE 115 may receive packet delay measurement information for a packet or per group of packets associated with one or more of a downlink or an uplink. One or more of the base station 105 or the UE 115 may then calculate or recalculate packet delay requirements to compensate for measured loss in other packet delay components. The wireless communications system 100 may provide benefits and enhancements to the operation of one or more of the base station 105 or the UE 115, including reduced power consumption, and may promote higher reliability and lower latency wireless communications, among other benefits.

Figure 2:
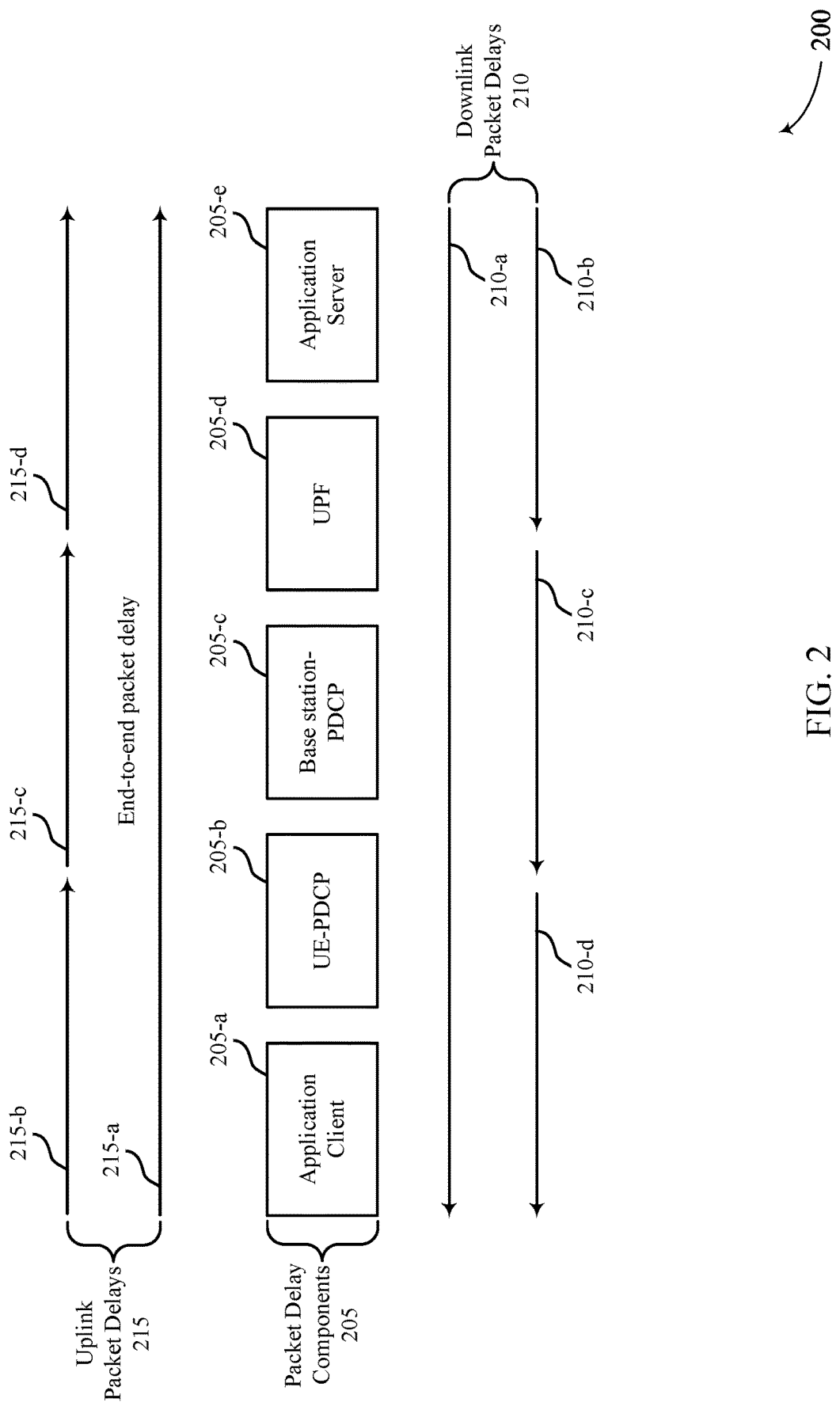

FIG. 2 illustrates an example of a wireless communications system 200 that supports managing an end-to-end delay budget for wireless communications in accordance with aspects of the present disclosure. In some examples, the wireless communications system 200 may implement or be implemented by aspects of the wireless communications system 100. For example, the wireless communications system 200 may include packet delay components 205 which may correspond to devices described herein with reference to FIG. 1.

A wireless communications system (e.g., a packet-based network) may include various communication devices, such as a UE and a base station, which may provide services to the UE. The wireless communications system may support multiple radio access technologies including fifth generation (5G) systems, which may be referred to as 5G new radio (NR). The UE may communicate with an application client and may transmit to or receive from a server (e.g., an application server) packets associated with an application via the base station (e.g., a gNB), which may communicate with an access network (e.g., a RAN). The RAN may communicate with a UPF to facilitate exchange of the packets with the application server.

In some cases, the packets may experience a packet delay associated with the exchange of the packets between one or more of the packet delay components 205, including an application client 205-a, a UE-PDCP 205-b, a base station-PDCP 205-c, a UPF 205-d, and an application server 205-e. The downlink delays 210 may include the end-to-end downlink packet delay 210-a of internet protocol (IP) packets from the application server to the application client, which may be the sum of a server to UPF downlink packet delay 210-b, a 5G UPF to UE-PDCP packet delay 210-c, and a UE-PDCP to application client (e.g., datapath) packet delay 210-d. These packet delays may vary over time, which may be due to various factors such as network congestion, power saving, and wireless channel variations, among other examples. For example, the server to UPF downlink packet delay 210-b may vary due to network congestion or processing bottlenecks, the UE-PDCP to application client packet delay 210-d may vary due to power saving (e.g., for data processing), low-latency mode (LLM) settings, network congestion, and processing bottlenecks. The 5G UPF to UE-PDCP packet delay 210-c may vary due to airlink congestion or wireless channel variations.

The packets may also experience one or more uplink packet delays 215 associated with the exchange of packets between one or more packet delay components 205. The uplink packet delays 215 may include the end-to-end uplink packet delay 215-a of IP packets from the application client to the application server, which may be the sum of an application client to UE-PDCP packet delay 215-b, a 5G UE-PDCP to UPF packet delay 215-c, and a UPF to application server packet delay 215-d. These packet delays may vary over time, which may be due to various factors such as network congestion, power saving, and wireless channel variations, among other examples.

In some cases, the UE-PDCP 205-b and the UPF 205-d may transmit an indication of a packet delay (e.g., a downlink packet delay notification) to the base station-PDCP 205-c based on a packet delay inference at the UE-PDCP 205-b and the UPF 205-c. In some cases, the inference of the packet delay may be based on the time of a generation stamp in a header of the packet (e.g., a real-time transport protocol (RTP) timestamp). In some cases, this may be a jitter based calculation, which may not use a time sync. In some cases, without end-to-end delay awareness, a wireless communications system may lack information on whether the packet delay indication from the UPF 205-c is problematic and therefore actionable. As such, any action by the wireless communications system may use additional resources (e.g., using available capacity). The wireless communications system may also lack a single packet delay component 205 to ensure an end-to-end delay (e.g., the end-to-end downlink packet delay 210-a and the end-to-end uplink packet delay 215-a) and a method for breaking down end-to-end requirements into individual packet delay components 205 (e.g., which may currently be left to deployment). In some cases, low-latency edge applications may benefit from ensuring an end-to-end delay.

Figure 3:
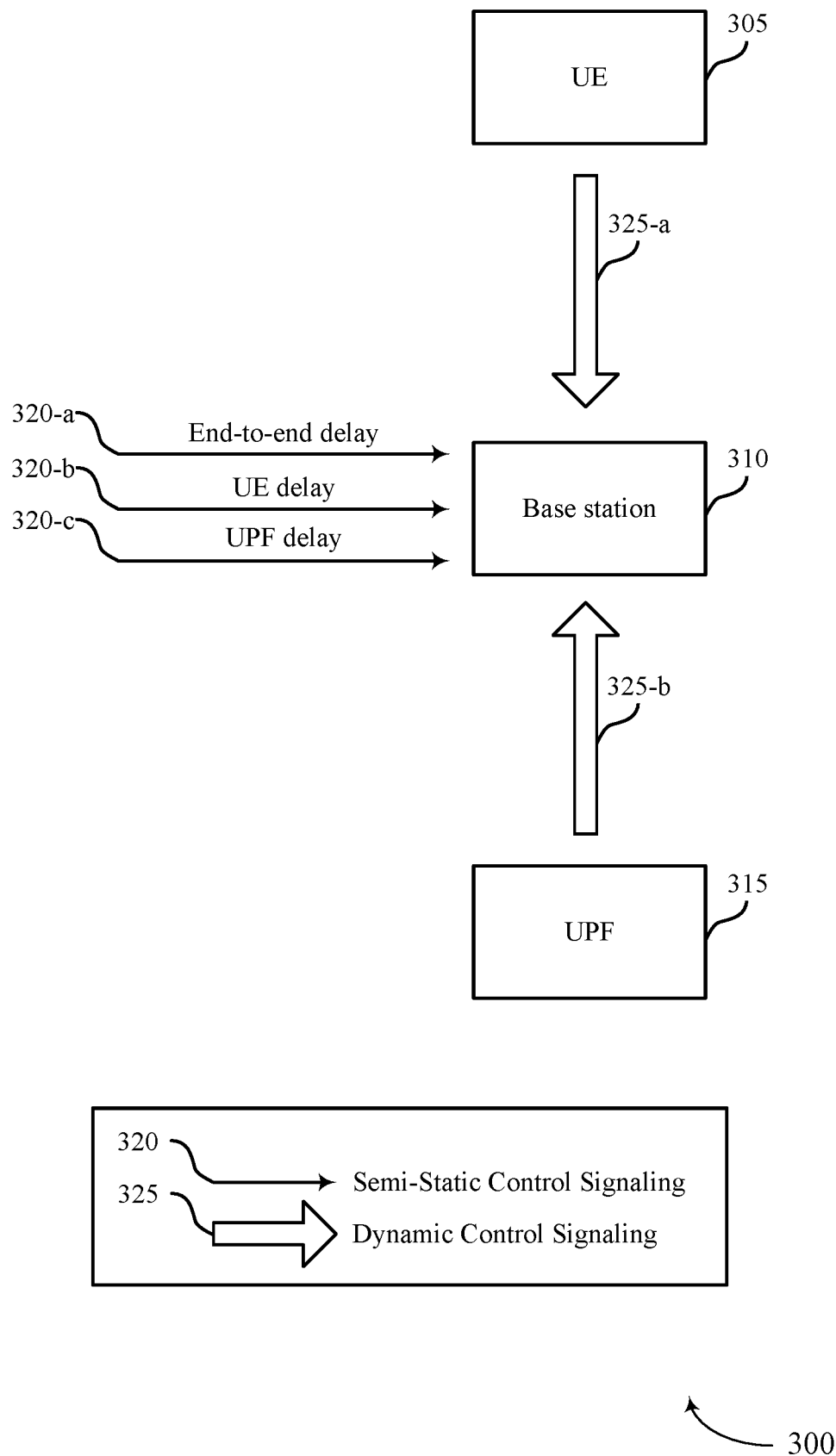

FIG. 3 illustrates an example of a wireless communications system 300 that supports managing an end-to-end delay budget for wireless communications in accordance with aspects of the present disclosure. In some examples, the wireless communications system 300 may implement or be implemented by aspects of the wireless communications system 100. For example, the wireless communications system 300 may include a UE 305, a base station 310, and a UPF 315, which may correspond to devices described herein with reference to FIG. 1.

The wireless communications system 300 may use techniques for managing packets, and more particularly for end-to-end downlink packet delay management and end-to-end uplink packet delay management. A delay manager (e.g., a UE 305 or a base station 310) may receive semi-static control signaling indicating one or more delay requirements in the control plane (e.g., RRC at the airlink), which may have a frequency on the order of hundreds of milliseconds to seconds. In some cases, the semi-static requirement signaling may inform the delay manager of an end-to-end delay requirement, which may be a nominal requirement on delay components not directly controlled by the delay manager. In some cases, the delay manager may derive a nominal requirement on the delay component controlled by the delay manager.

Additionally, or alternatively, the delay manager may receive dynamic control signaling indicating one or more delay measurements in the control plane or the data plane, which may have a frequency on the order of 1 to several milliseconds. An upstream entity may transmit a delay measurement (e.g., measure packet delayed) for a current packet or a group of packets to the delay manager. An upstream entity may include one or more of the UE 305, the base station 310, or a UPF 315. A downstream entity may transmit a delay measurement (e.g., measure packet delayed) per group of packets to the delay manager. A downlink entity may include one or more of the UE 305, the base station 310, or the UPF 315. The delay manager may calculate or recalculate the delay component requirement to compensate for measured loss in other packet delay components.

The wireless communications system 300 may use techniques for end-to-end downlink delay management at the base station 310. In some cases, the UE 305 and the UPF 315 may transmit semi-static control signaling 320 (e.g., semi-static control plane signaling) to the base station 310 to inform the base station 310 of one or more delay requirements. In some cases, the delay requirements may be indicated for an end-to-end downlink delay via semi-static control signaling 320-*a*, a UE to application client downlink delay via semi-static control signaling 320-*b*, and an application server to UPF downlink delay via semi-static control signaling 320-*c*. The base station 310 may derive the requirement based on the 5G downlink PDB minus the end-to-end downlink delay, the UE to application client downlink delay, and the application server to UPF downlink delay. The base station may further refine the 5G downlink PDB to airlink versus the core network to RAN components.

In some cases, the UE 305 and the UPF 315 may transmit dynamic control signaling 325 to the base station 310 to inform the base station 310 of packet delay measurements. The UPF 315 may transmit packet delay measurements via the dynamic control signaling 325-*b* to the base station on a per-packet or a per-group of packets basis if the packets are delayed beyond the server to UPF downlink delay. The UE 305 may transmit packet delay measurements via the dynamic control signaling 325-*a* to the base station 310 on a per-group of packets basis if the packets are delayed beyond the end-to-end delay. The base station 310 may use the measurements to calculate or recalculate the 5G downlink PDB on an ongoing basis.

End-to-end uplink delay management may also occur at the base station 310. In some cases, the UE 305 and the UPF 315 may transmit semi-static control signaling 320 (e.g., semi-static control plane signaling) to the base station 310 to inform the base station 310 of one or more delay requirements. The delay requirements may be indicated for an end-to-end uplink delay via the semi-static control signaling 320-*a*, an application client to UE uplink delay via semi-static control signaling 320-*b*, and a UPF to application server uplink delay via semi-static control signaling 320-*c*. The base station 310 may derive one or more packet delay requirements based on the 5G downlink PDB minus the end-to-end uplink delay, the application client to UE uplink delay, and the UPF to application server uplink delay. The base station 310 may further refine the 5G downlink PDB to airlink versus the core network-to-RAN components.

In some cases, the UE 305 and the UPF 315 may transmit dynamic control signaling 325 to the base station 310 to inform the base station 310 of packet delay measurements. The UE 305 may transmit packet delay measurements via the dynamic control signaling 325-*a* to the base station 310 on a per packet or per-group of packets basis if the packets are delayed beyond the application client to UE uplink delay. The UPF 315 may transmit packet delay measurements via dynamic control signaling 325-*b* to the base station 310 on a per-group of packets basis if the packets are delayed beyond the end-to-end uplink delay minus the UPF to application server uplink delay. The base station 310 may use the measurements to calculate or recalculate the 5G downlink PDB on an ongoing basis.

Figure 4A:
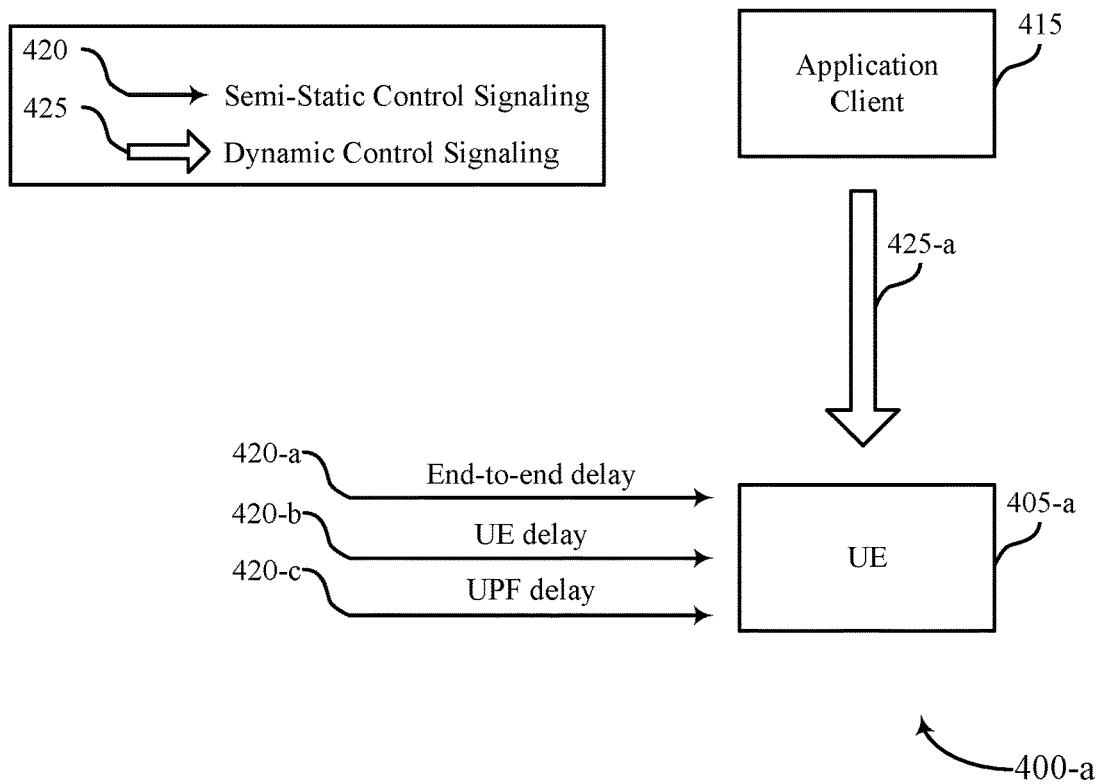
FIGS. 4A and 4B illustrate examples of wireless communications systems that support managing an end-to-end delay budget for wireless communications in accordance with aspects of the present disclosure.

FIG. 4A illustrates an example of a wireless communications system 400-*a* that supports managing an end-to-end delay budget for wireless communications in accordance with aspects of the present disclosure. In some examples, the wireless communications system 400-*a* may implement or be implemented by aspects of the wireless communications system 100. For example, the wireless communications system 400-*a* may include a UE 405-*a* and an application client 415, which may correspond to devices described herein with reference to FIG. 1.

The wireless communications system 400-*a* may use techniques for end-to-end downlink delay management at the UE 405-*a*. In some cases, the application client 415 may transmit semi-static control signaling 420 (e.g., semi-static control plane signaling) to the UE 405-*a* to inform the UE 405-*a* of some or all of a set of delay requirements. In some cases, the delay requirements may be indicated for an end-to-end downlink delay via semi-static control signaling 420-*a*, a downlink PDB (also referred to as 5G downlink PDB) via semi-static control signaling 420-*b*, and an application server-to-UPF downlink delay via semi-static control signaling 420-*c*. The UE 405-*a* may derive the packet delay requirements using the UE to application client delay minus the end-to-end downlink delay, the 5G downlink PDB, and the application server to UPF downlink delay.

The UE 405-*a* may estimate the delay requirements if the UE 405-*a* lacks explicit communication of the delay requirements from the application client 415. In some cases, the application client 415 may transmit dynamic control signaling 425 to the UE 405-*a* to inform the UE 405-*a* of packet delay measurements. The UE 405-*a* may measure whether the packets are delayed beyond the 5G downlink PDB plus the application server to UPF downlink delay on a per-packet or per-group of packets basis. The UE 405-*a* may receive packet delay measurements from the application client 415 via dynamic control signaling 425-*a* on a per-group of packets basis if the packets are delayed beyond the end-to-end downlink delay. The UE 405-*a* may calculate or recalculate the UE-to-application client downlink delay on an ongoing basis.

Figure 4B:
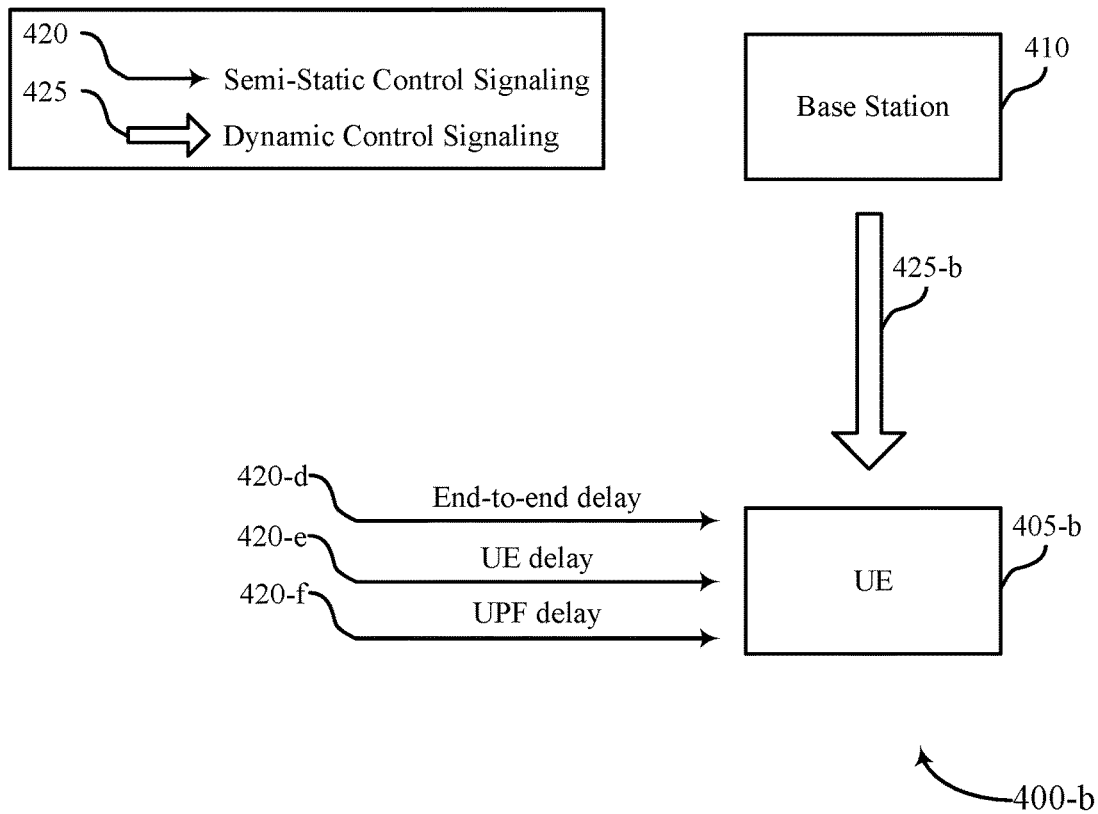

FIG. 4B illustrates an example of a wireless communications system 400-*b* that supports managing an end-to-end delay budget for wireless communications in accordance with aspects of the present disclosure. In some examples, the wireless communications system 400-*b* may implement or be implemented by aspects of the wireless communications system 100. For example, the wireless communications system 400-*b* may include a UE 405-*b* and a base station 410, which may correspond to devices described herein with reference to FIG. 1.

The wireless communications system 400-*b* may use techniques for end-to-end uplink delay management at the UE 405-*b*. In some cases, the base station 410 may transmit semi-static control signaling 420 (e.g., semi-static control plane signaling) to the UE 405-*b* to inform the UE 405-*b* of some or all of a set of delay requirements. In some cases, the delay requirements may be indicated for an end-to-end uplink delay via semi-static control signaling 420-*d*, an uplink PDB (also referred to as a 5G uplink PDB) via semi-static control signaling 420-*e*, and a UPF to application server uplink delay via semi-static control signaling 420-*f*. The UE 405-*b* may derive the packet delay requirements using the application client to UE uplink delay minus the end-to-end uplink delay, the 5G uplink PDB, and the UPF to application server uplink delay.

The UE 405-*b* may estimate the delay requirements if the UE 405-*b* lacks explicit communication of the delay requirements from the base station 410. The base station 410 may transmit dynamic control signaling 425 to the UE 405-*b* to inform the UE 405-*b* of packet delay measurements. In some examples, the UE 405-*b* may receive the packet delay measurements from the base station 410 via dynamic control signaling 425-*b* on a per-group of packets basis if the packets are delayed beyond an uplink PDB. The UE 405-*b* may calculate or recalculate the UE to application client downlink delay on an ongoing basis.

Figure 5:
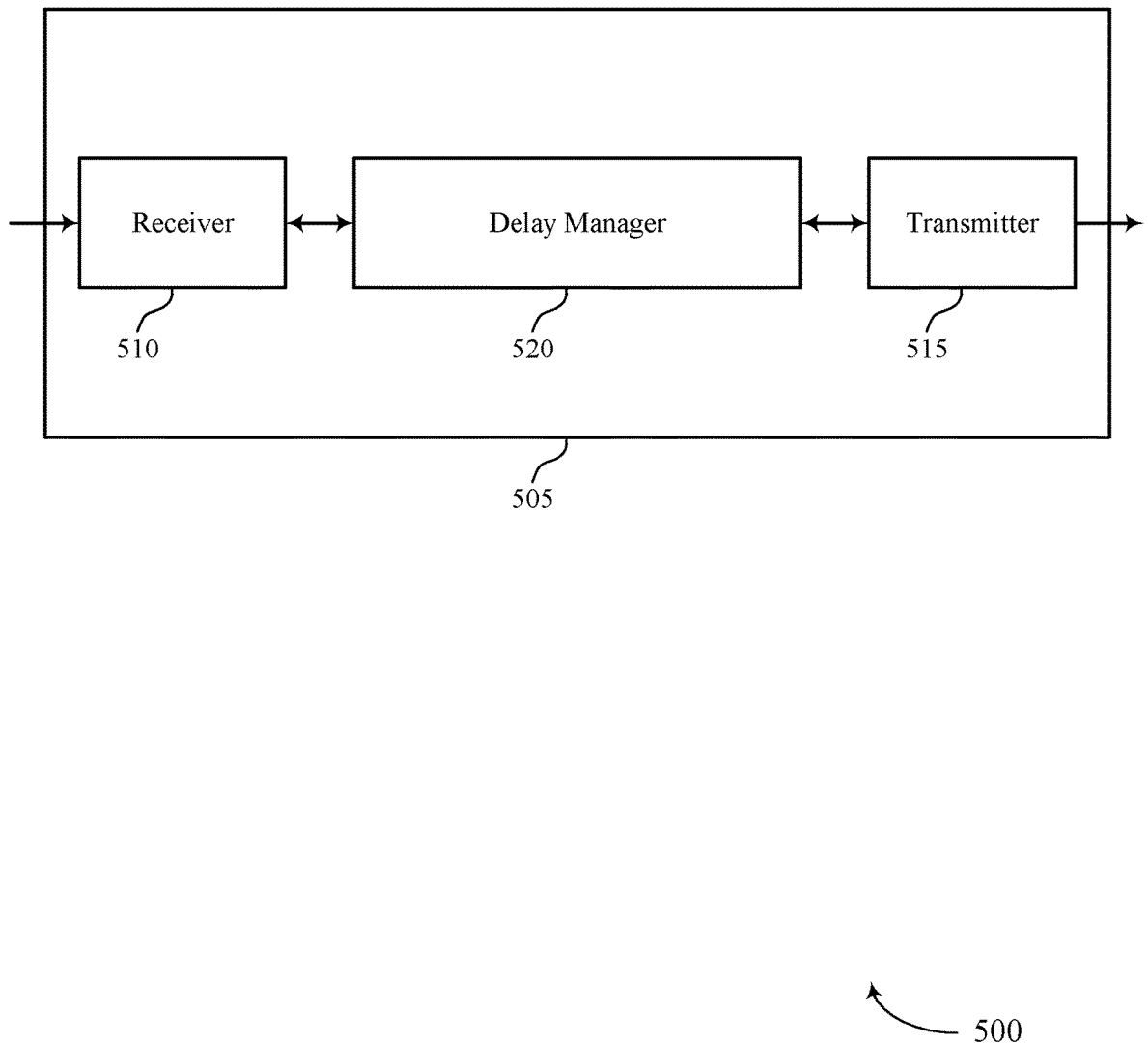
FIGS. 5 and 6 show block diagrams of devices that support managing an end-to-end delay budget for wireless communications in accordance with aspects of the present disclosure.

FIG. 5 shows a block diagram 500 of a device 505 that supports managing an end-to-end delay budget for wireless communications in accordance with aspects of the present disclosure. The device 505 may be an example of aspects of a delay manager as described herein. The device 505 may include a receiver 510, a transmitter 515, and a delay manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to managing an end-to-end delay budget for wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to managing an end-to-end delay budget for wireless communications). In some examples, the transmitter 515 may be co-located with a receiver 510 in a transceiver. The transmitter 515 may utilize a single antenna or a set of multiple antennas.

The delay manager 520, the receiver 510, the transmitter 515, or various combinations thereof or various components thereof may be examples of means for performing various aspects of managing an end-to-end delay budget for wireless communications as described herein. For example, the delay manager 520, the receiver 510, the transmitter 515, or various combinations or components thereof may support a method for performing one or more of the functions described herein.

In some examples, the delay manager 520, the receiver 510, the transmitter 515, or various combinations or components thereof may be implemented in hardware (e.g., in communications management circuitry). The hardware may include a processor, a digital signal processor (DSP), an application specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the delay manager 520, the receiver 510, the transmitter 515, or various combinations or components thereof may be implemented in code (e.g., as communications management software or firmware) executed by a processor. If implemented in code executed by a processor, the functions of the delay manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the delay manager 520 may be configured to perform various operations (e.g., receiving, monitoring, transmitting) using or otherwise in cooperation with the receiver 510, the transmitter 515, or both. For example, the delay manager 520 may receive information from the receiver 510, send information to the transmitter 515, or be integrated in combination with the receiver 510, the transmitter 515, or both to receive information, transmit information, or perform various other operations as described herein.

For example, the delay manager 520 may be configured as or otherwise support a means for receiving semi-static control signaling indicating a packet delay requirement. The delay manager 520 may be configured as or otherwise support a means for receiving dynamic control signaling indicating a packet delay measurement for one or more of a packet or a group of packets associated with the wireless communication in one or more of a downlink or an uplink. The delay manager 520 may be configured as or otherwise support a means for adjusting a packet delay parameter to compensate a delay for one or more of the downlink or the uplink based on the packet delay requirement and the packet delay measurement. The delay manager 520 may be configured as or otherwise support a means for communicating in one or more of the downlink or the uplink based on the adjusted packet delay parameter.

By including or configuring the delay manager 520 in accordance with examples as described herein, the device 505 (e.g., a processor controlling or otherwise coupled to the receiver 510, the transmitter 515, the delay manager 520, or a combination thereof) may support techniques for managing an end-to-end delay budget for wireless communications, which may provide benefits and enhancements to the operation of one or more devices, including reduced power consumption, and may promote higher reliability and lower latency wireless communications, among other benefits.

Figure 6:
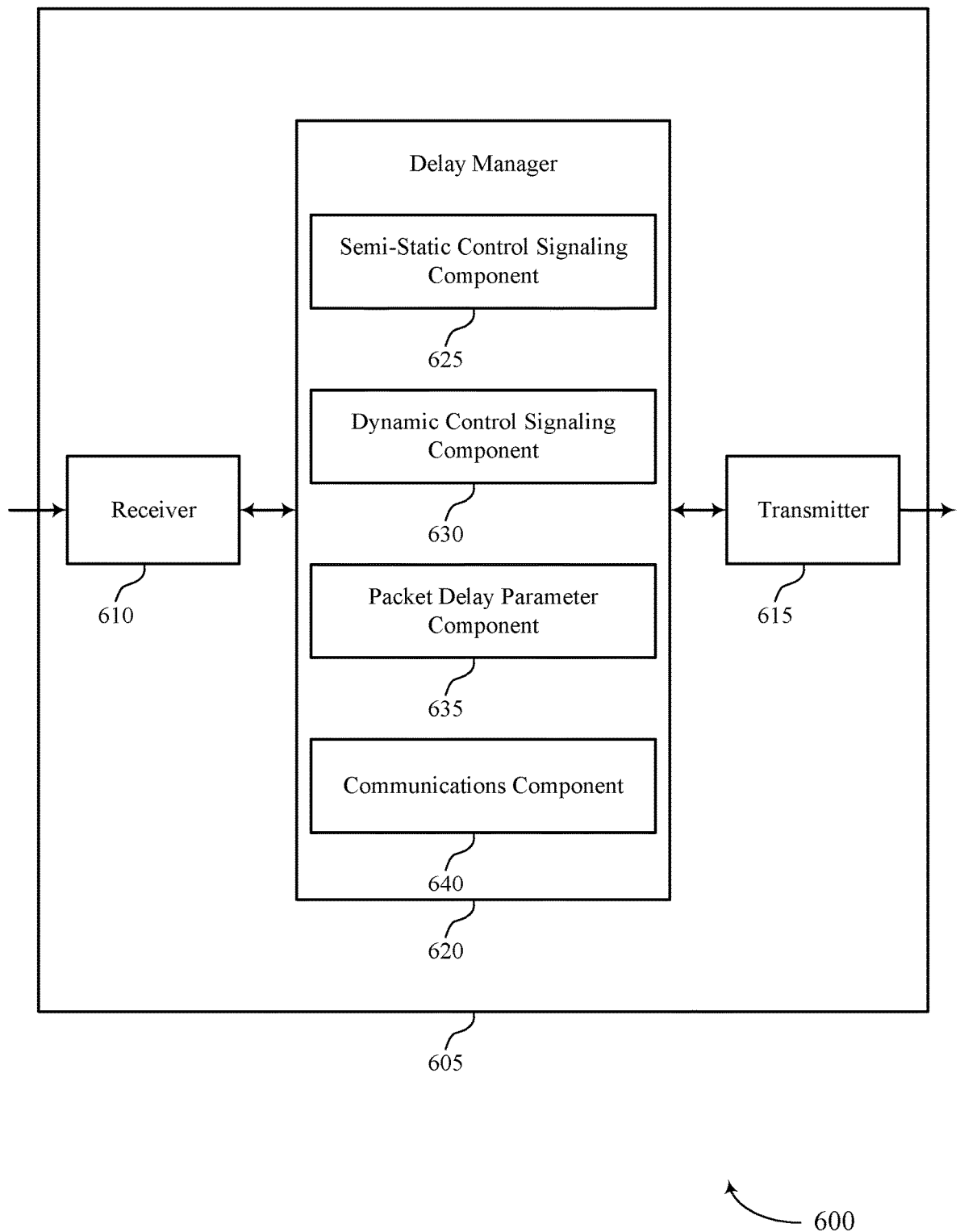

FIG. 6 shows a block diagram 600 of a device 605 that supports managing an end-to-end delay budget for wireless communications in accordance with aspects of the present disclosure. The device 605 may be an example of aspects of a device 505 as described herein. The device 605 may include a receiver 610, a transmitter 615, and a delay manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to managing an end-to-end delay budget for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to managing an end-to-end delay budget for wireless communications). In some examples, the transmitter 615 may be co-located with a receiver 610 in a transceiver. The transmitter 615 may utilize a single antenna or a set of multiple antennas.

The device 605, or various components thereof, may be an example of means for performing various aspects of managing an end-to-end delay budget for wireless communications as described herein. For example, the delay manager 620 may include a semi-static control signaling component 625, a dynamic control signaling component 630, a packet delay parameter component 635, a communications component 640, or any combination thereof. The delay manager 620 may be an example of aspects of a delay manager 520 as described herein. In some examples, the delay manager 620, or various components thereof, may be configured to perform various operations (e.g., receiving, monitoring, transmitting) using or otherwise in cooperation with the receiver 610, the transmitter 615, or both. For example, the delay manager 620 may receive information from the receiver 610, send information to the transmitter 615, or be integrated in combination with the receiver 610, the transmitter 615, or both to receive information, transmit information, or perform various other operations as described herein.

The semi-static control signaling component 625 may be configured as or otherwise support a means for receiving semi-static control signaling indicating a packet delay requirement. The dynamic control signaling component 630 may be configured as or otherwise support a means for receiving dynamic control signaling indicating a packet delay measurement for one or more of a packet or a group of packets associated with the wireless communication in one or more of a downlink or an uplink. The packet delay parameter component 635 may be configured as or otherwise support a means for adjusting a packet delay parameter to compensate a delay for one or more of the downlink or the uplink based on the packet delay requirement and the packet delay measurement. The communications component 640 may be configured as or otherwise support a means for communicating in one or more of the downlink or the uplink based on the adjusted packet delay parameter.

Figure 7:
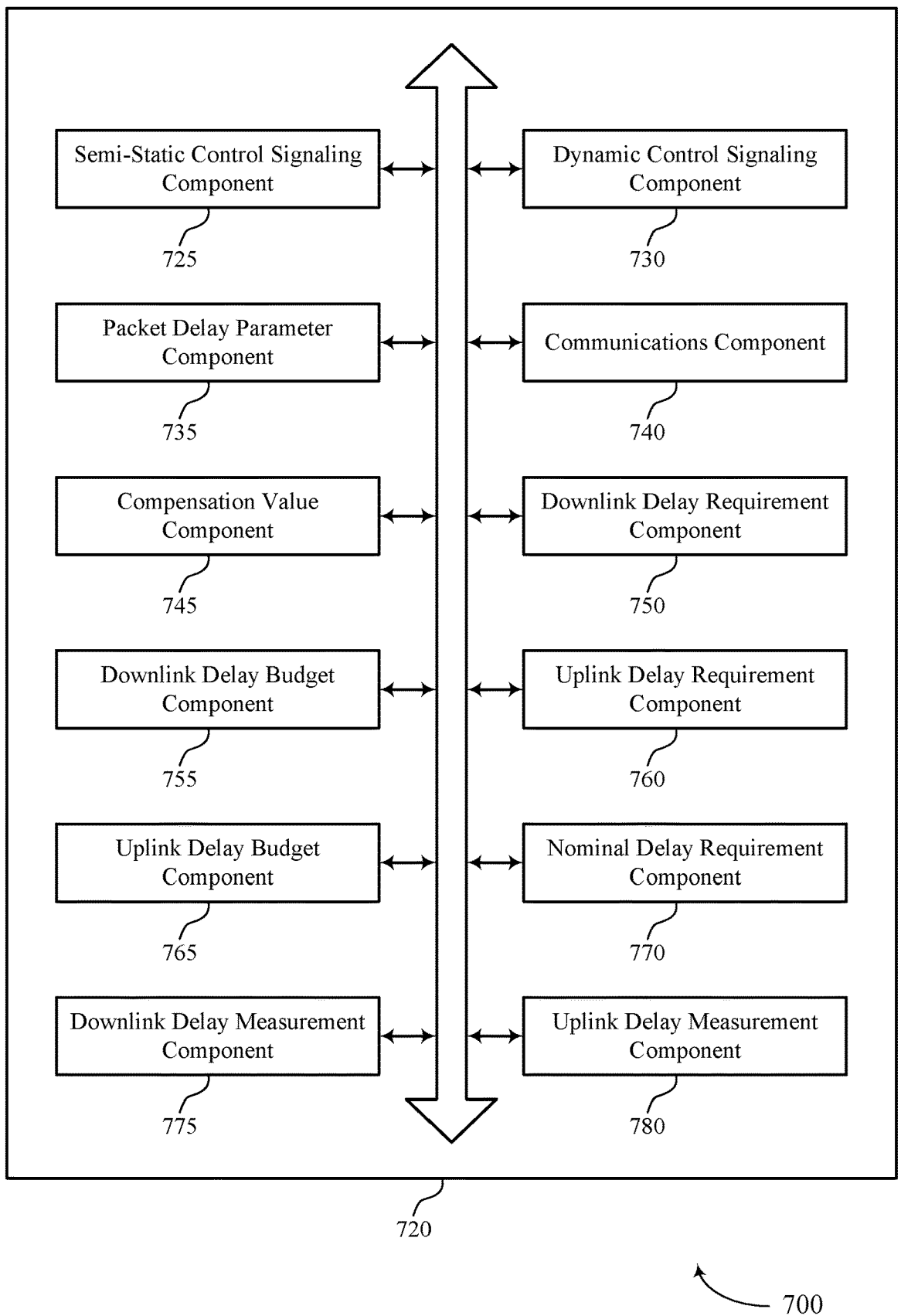
FIG. 7 shows a block diagram of a delay manager that supports managing an end-to-end delay budget for wireless communications in accordance with aspects of the present disclosure.

FIG. 7 shows a block diagram 700 of a delay manager 720 that supports managing an end-to-end delay budget for wireless communications in accordance with aspects of the present disclosure. The delay manager 720 may be an example of aspects of a delay manager 520, a delay manager 620, or both, as described herein. The delay manager 720, or various components thereof, may be an example of means for performing various aspects of managing an end-to-end delay budget for wireless communications as described herein. For example, the delay manager 720 may include a semi-static control signaling component 725, a dynamic control signaling component 730, a packet delay parameter component 735, a communications component 740, a compensation value component 745, a downlink delay requirement component 750, a downlink delay budget component 755, an uplink delay requirement component 760, an uplink delay budget component 765, a nominal delay requirement component 770, a downlink delay measurement component 775, an uplink delay measurement component 780, or any combination thereof. Each of these components may communicate, directly or indirectly, with one another (e.g., via one or more buses).

The semi-static control signaling component 725 may be configured as or otherwise support a means for receiving semi-static control signaling indicating a packet delay requirement. The dynamic control signaling component 730 may be configured as or otherwise support a means for receiving dynamic control signaling indicating a packet delay measurement for one or more of a packet or a group of packets associated with the wireless communication in one or more of a downlink or an uplink. The packet delay parameter component 735 may be configured as or otherwise support a means for adjusting a packet delay parameter to compensate a delay for one or more of the downlink or the uplink based on the packet delay requirement and the packet delay measurement. The communications component 740 may be configured as or otherwise support a means for communicating in one or more of the downlink or the uplink based on the adjusted packet delay parameter.

In some examples, the compensation value component 745 may be configured as or otherwise support a means for determining a compensation value for the packet delay requirement based on the packet delay measurement for one or more of the packet or the group of packets associated with the wireless communication in one or more of the downlink or the uplink. In some examples, the packet delay parameter component 735 may be configured as or otherwise support a means for adjusting the packet delay parameter based on the compensation value for the packet delay requirement.

In some examples, the downlink delay requirement component 750 may be configured as or otherwise support a means for determining one or more of an end-to-end downlink delay requirement, a UE to an application client downlink delay requirement, or an application server to a UPF downlink delay requirement, based on the semi-static control signaling. In some examples, the downlink delay budget component 755 may be configured as or otherwise support a means for determining a downlink PDB based on a difference between one or more of the end-to-end downlink delay requirement, the UE to the application client downlink delay requirement, or the application server to the UPF downlink delay requirement. In some examples, the packet delay parameter component 735 may be configured as or otherwise support a means for adjusting the packet delay parameter based on the downlink PDB.

In some examples, the downlink delay measurement component 775 may be configured as or otherwise support a means for receiving, from a UPF, an indication of the packet delay measurement for one or more of the packet or the group of packets associated with the wireless communication in one or more of the downlink or the uplink based on a delay of one or more of the packet or the group of packets satisfying a threshold. In some examples, the downlink delay budget component 755 may be configured as or otherwise support a means for adjusting the downlink PDB based on the delay of one or more of the packet or the group of packets satisfying the threshold, the threshold including the application server to the UPF downlink delay requirement. In some examples, the packet delay parameter component 735 may be configured as or otherwise support a means for adjusting the packet delay parameter based on the adjusted downlink PDB.

In some examples, the downlink delay measurement component 775 may be configured as or otherwise support a means for receiving, from the UE, an indication of the packet delay measurement for one or more of the packet or the group of packets associated with the wireless communication in one or more of the downlink or the uplink based on a delay of one or more of the packet or the group of packets satisfying a threshold. In some examples, the downlink delay budget component 755 may be configured as or otherwise support a means for adjusting the downlink PDB based on the delay of one or more of the packet or the group of packets satisfying the threshold, the threshold including the end-to-end downlink delay requirement. In some examples, the packet delay parameter component 735 may be configured as or otherwise support a means for adjusting the packet delay parameter based on the adjusted downlink PDB.

In some examples, the uplink delay requirement component 760 may be configured as or otherwise support a means for determining one or more of an end-to-end uplink delay requirement, an application client to a UE uplink delay requirement, or a UPF to an application server uplink delay requirement, based on the semi-static control signaling. In some examples, the uplink delay budget component 765 may be configured as or otherwise support a means for determining an uplink PDB based on a difference between one or more of the end-to-end uplink delay requirement, the application client to the UE uplink delay requirement, or the UPF to the application server uplink delay requirement. In some examples, the packet delay parameter component 735 may be configured as or otherwise support a means for adjusting the packet delay parameter based on the uplink PDB.

In some examples, the uplink delay measurement component 780 may be configured as or otherwise support a means for receiving, from a UE, an indication of the packet delay measurement for one or more of the packet or the group of packets associated with the wireless communication in one or more of the downlink or the uplink based on a delay of one or more of the packet or the group of packets satisfying a threshold. In some examples, the uplink delay budget component 765 may be configured as or otherwise support a means for adjusting the uplink PDB based on the delay of one or more of the packet or the group of packets satisfying the threshold, the threshold including the application client to the UE uplink delay requirement. In some examples, the packet delay parameter component 735 may be configured as or otherwise support a means for adjusting the packet delay parameter based on the adjusted uplink PDB.

In some examples, the uplink delay measurement component 780 may be configured as or otherwise support a means for receiving, from the UPF, an indication of the packet delay measurement for one or more of the packet or the group of packets associated with the wireless communication in one or more of the downlink or the uplink based on a delay of one or more of the packet or the group of packets satisfying a threshold. In some examples, the uplink delay budget component 765 may be configured as or otherwise support a means for adjusting the uplink PDB based on the delay of one or more of the packet or the group of packets satisfying the threshold, the threshold including a difference between the end-to-end uplink delay requirement and the UPF to the application server uplink delay requirement. In some examples, the packet delay parameter component 735 may be configured as or otherwise support a means for adjusting the packet delay parameter based on the adjusted uplink PDB.

In some examples, the downlink delay budget component 755 may be configured as or otherwise support a means for determining one or more of an end-to-end downlink delay requirement, a downlink PDB requirement, or an application server to a UPF downlink delay requirement, based on the semi-static control signaling. In some examples, the downlink delay requirement component 750 may be configured as or otherwise support a means for determining a UE to an application client downlink delay requirement based on a difference between one or more of the end-to-end downlink delay requirement, the downlink PDB requirement, or the application server to the UPF downlink delay requirement. In some examples, the packet delay parameter component 735 may be configured as or otherwise support a means for adjusting the packet delay parameter based on the UE to the application client downlink delay requirement.

In some examples, the downlink delay measurement component 775 may be configured as or otherwise support a means for performing the packet delay measurement for one or more of the packet or the group of packets associated with the wireless communication in one or more of the downlink or the uplink based on a delay of one or more of the packet or the group of packets satisfying a threshold. In some examples, the downlink delay requirement component 750 may be configured as or otherwise support a means for adjusting the UE to the application client downlink delay requirement based on the delay of one or more of the packet or the group of packets satisfying the threshold, the threshold including one or more of the downlink PDB requirement or the application server to the UPF downlink delay requirement. In some examples, the packet delay parameter component 735 may be configured as or otherwise support a means for adjusting the packet delay parameter based on the adjusting of the UE to the application client downlink delay requirement.

In some examples, the downlink delay measurement component 775 may be configured as or otherwise support a means for receiving, from an application client, an indication of the packet delay measurement for one or more of the packet or the group of packets associated with the wireless communication in one or more of the downlink or the uplink based on a delay of one or more of the packet or the group of packets satisfying a threshold. In some examples, the downlink delay requirement component 750 may be configured as or otherwise support a means for adjusting the UE to the application client downlink delay requirement based on the delay of one or more of the packet or the group of packets satisfying the threshold, the threshold including the end-to-end downlink delay requirement. In some examples, the packet delay parameter component 735 may be configured as or otherwise support a means for adjusting the packet delay parameter based on the adjusting of the UE to the application client downlink delay requirement.

In some examples, the uplink delay budget component 765 may be configured as or otherwise support a means for determining one or more of an end-to-end uplink delay requirement, an uplink PDB requirement, or a UPF to an application server uplink delay requirement, based on the semi-static control signaling. In some examples, the uplink delay requirement component 760 may be configured as or otherwise support a means for determining a UE to an application server uplink delay requirement based on a difference between one or more of the end-to-end uplink delay requirement, the uplink PDB requirement, or the UPF to the application server uplink delay requirement. In some examples, the packet delay parameter component 735 may be configured as or otherwise support a means for where adjusting the packet delay parameter is based on the UE to an application server uplink delay requirement.

In some examples, the uplink delay measurement component 780 may be configured as or otherwise support a means for receiving, from a base station an indication, of the packet delay measurement for one or more of the packet or the group of packets associated with the wireless communication in one or more of the downlink or the uplink based on a delay of one or more of the packet or the group of packets satisfying a threshold. In some examples, the uplink delay requirement component 760 may be configured as or otherwise support a means for adjusting the UE to an application server uplink delay requirement based on the delay of one or more of the packet or the group of packets satisfying the threshold, the threshold including the uplink PDB requirement. In some examples, the packet delay parameter component 735 may be configured as or otherwise support a means for adjusting the packet delay parameter based on the adjusting of the UE to an application server uplink delay requirement.

In some examples, the nominal delay requirement component 770 may be configured as or otherwise support a means for determining a nominal packet delay requirement decoupled from the device based on the semi-static control signaling. In some examples, the packet delay parameter component 735 may be configured as or otherwise support a means for adjusting the packet delay parameter based on the nominal packet delay requirement decoupled from the device. In some examples, the nominal delay requirement component 770 may be configured as or otherwise support a means for determining a nominal packet delay requirement coupled to the device based on the semi-static control signaling. In some examples, the packet delay parameter component 735 may be configured as or otherwise support a means for adjusting the packet delay parameter based on the nominal packet delay requirement coupled to the device. In some examples, the semi-static control signaling includes an RRC message. In some examples, the dynamic control signaling DCI or a MAC-CE. In some examples, the device includes a UE or a base station.

Figure 8:
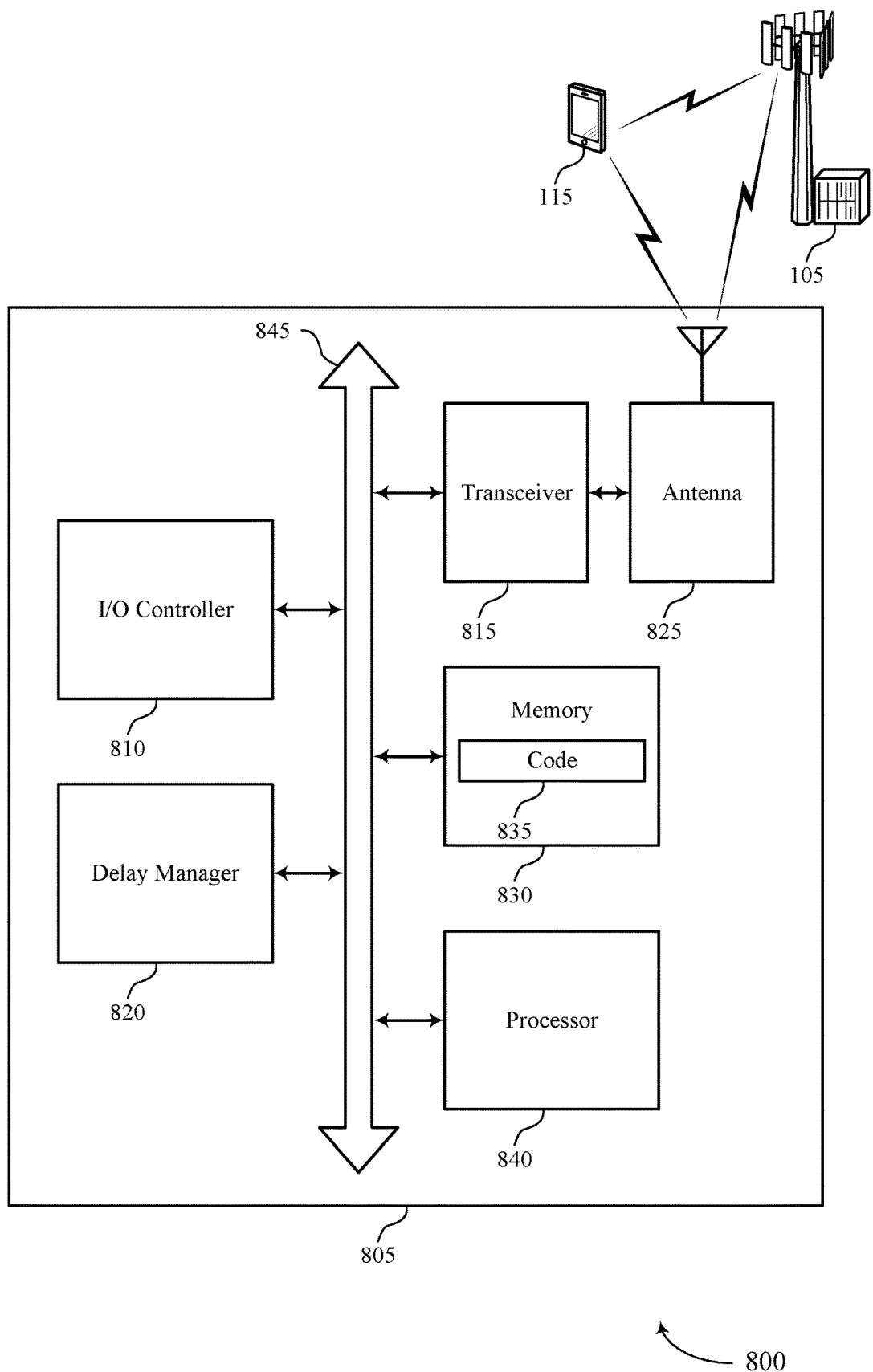
FIG. 8 shows a diagram of a system including a device that supports managing an end-to-end delay budget for wireless communications in accordance with aspects of the present disclosure.

FIG. 8 shows a diagram of a system 800 including a device 805 that supports managing an end-to-end delay budget for wireless communications in accordance with aspects of the present disclosure. The device 805 may be an example of or include the components of a device 505, a device 605, or a delay manager as described herein. The device 805 may include components for bi-directional voice and data communications including components for transmitting and receiving communications, such as a delay manager 820, an I/O controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting managing an end-to-end delay budget for wireless communications). For example, the device 805 or a component of the device 805 may include a processor 840 and memory 830 coupled to the processor 840, the processor 840 and memory 830 configured to perform various functions described herein.

For example, the delay manager 820 may be configured as or otherwise support a means for receiving semi-static control signaling indicating a packet delay requirement. The delay manager 820 may be configured as or otherwise support a means for receiving dynamic control signaling indicating a packet delay measurement for one or more of a packet or a group of packets associated with the wireless communication in one or more of a downlink or an uplink. The delay manager 820 may be configured as or otherwise support a means for adjusting a packet delay parameter to compensate a delay for one or more of the downlink or the uplink based on the packet delay requirement and the packet delay measurement. The delay manager 820 may be configured as or otherwise support a means for communicating in one or more of the downlink or the uplink based on the adjusted packet delay parameter.

By including or configuring the delay manager 820 in accordance with examples as described herein, the device 805 may support techniques for managing an end-to-end delay budget for wireless communications, which may provide benefits and enhancements to the operation of one or more devices, including reduced power consumption, and may promote higher reliability and lower latency wireless communications, among other benefits.

In some examples, the delay manager 820 may be configured to perform various operations (e.g., receiving, monitoring, transmitting) using or otherwise in cooperation with the transceiver 815, the one or more antennas 825, or any combination thereof. Although the delay manager 820 is illustrated as a separate component, in some examples, one or more functions described with reference to the delay manager 820 may be supported by or performed by the processor 840, the memory 830, the code 835, or any combination thereof. For example, the code 835 may include instructions executable by the processor 840 to cause the device 805 to perform various aspects of managing an end-to-end delay budget for wireless communications as described herein, or the processor 840 and the memory 830 may be otherwise configured to perform or support such operations.

Figure 9:
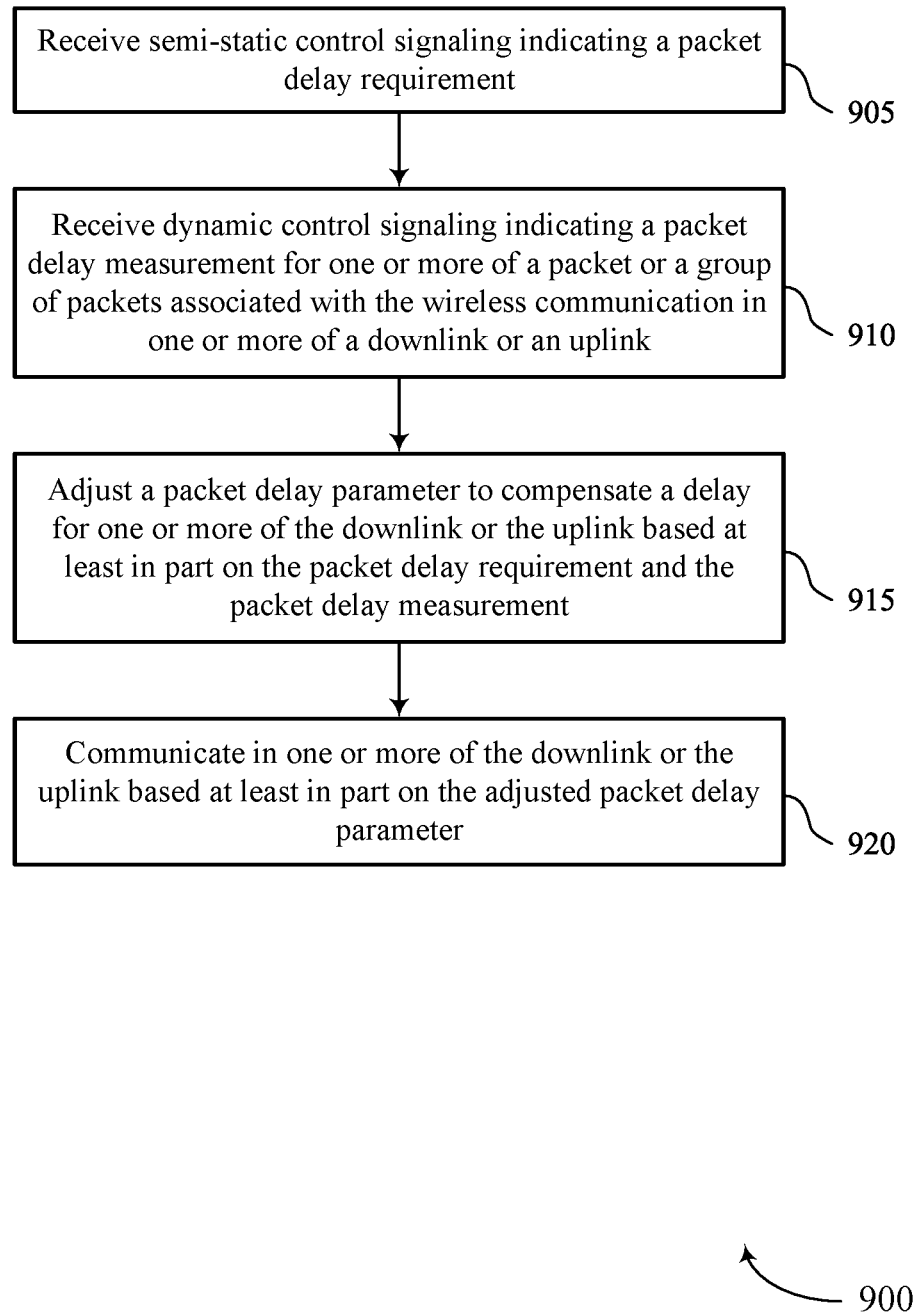
FIGS. 9 through 12 show flowcharts illustrating methods that support managing an end-to-end delay budget for wireless communications in accordance with aspects of the present disclosure.

FIG. 9 shows a flowchart illustrating a method 900 that supports managing an end-to-end delay budget for wireless communications in accordance with aspects of the present disclosure. The operations of the method 900 may be implemented by a base station 105 or a UE 115 or its components (e.g., a delay manager) as described herein. In some examples, the operations of the method 900 may be implemented by a delay manager or its components as described herein. For example, the operations of the method 900 may be performed by a delay manager as described with reference to FIGS. 1 through 8. In some examples, a delay manager may execute a set of instructions to control the functional elements of the delay manager to perform the described functions. Additionally or alternatively, the delay manager may perform aspects of the described functions using special-purpose hardware.

At 905, the method may include receiving semi-static control signaling indicating a packet delay requirement. The operations of 905 may be performed in accordance with examples as disclosed herein. In some examples, aspects of the operations of 905 may be performed by a semi-static control signaling component 725 as described with reference to FIG. 7.

At 910, the method may include receiving dynamic control signaling indicating a packet delay measurement for one or more of a packet or a group of packets associated with the wireless communication in one or more of a downlink or an uplink. The operations of 910 may be performed in accordance with examples as disclosed herein. In some examples, aspects of the operations of 910 may be performed by a dynamic control signaling component 730 as described with reference to FIG. 7.

At 915, the method may include adjusting a packet delay parameter to compensate a delay for one or more of the downlink or the uplink based on the packet delay requirement and the packet delay measurement. The operations of 915 may be performed in accordance with examples as disclosed herein. In some examples, aspects of the operations of 915 may be performed by a packet delay parameter component 735 as described with reference to FIG. 7.

At 920, the method may include communicating in one or more of the downlink or the uplink based on the adjusted packet delay parameter. The operations of 920 may be performed in accordance with examples as disclosed herein. In some examples, aspects of the operations of 920 may be performed by a communications component 740 as described with reference to FIG. 7.

Figure 10:
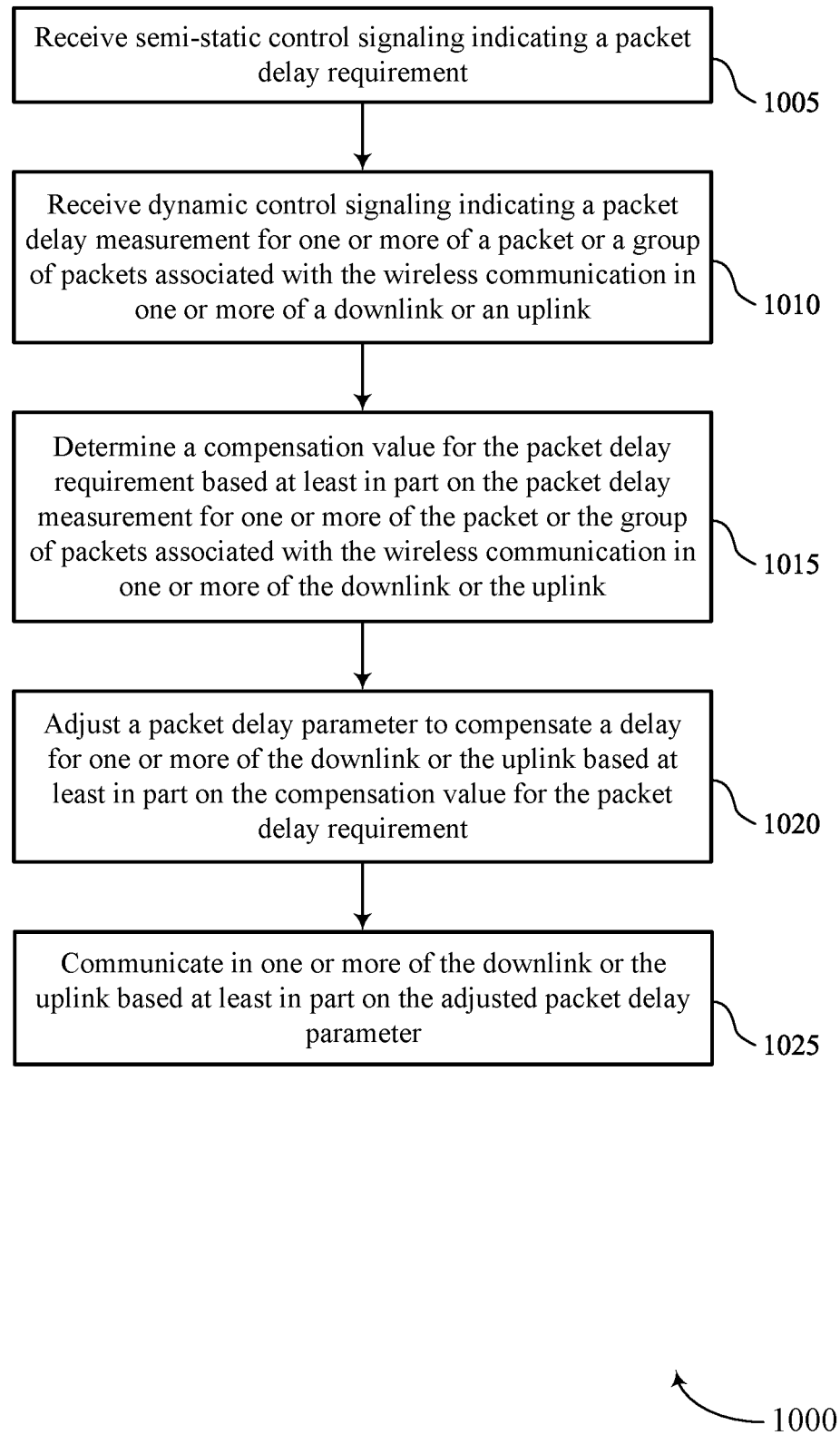

FIG. 10 shows a flowchart illustrating a method 1000 that supports managing an end-to-end delay budget for wireless communications in accordance with aspects of the present disclosure. The operations of the method 1000 may be implemented by a base station 105 or a UE 115 or its components (e.g., a delay manager) as described herein. In some examples, the operations of the method 1000 may be implemented by a delay manager or its components as described herein. For example, the operations of the method 1000 may be performed by a delay manager as described with reference to FIGS. 1 through 8. In some examples, a delay manager may execute a set of instructions to control the functional elements of the delay manager to perform the described functions. Additionally or alternatively, the delay manager may perform aspects of the described functions using special-purpose hardware.

At 1005, the method may include receiving semi-static control signaling indicating a packet delay requirement. The operations of 1005 may be performed in accordance with examples as disclosed herein. In some examples, aspects of the operations of 1005 may be performed by a semi-static control signaling component 725 as described with reference to FIG. 7.

At 1010, the method may include receiving dynamic control signaling indicating a packet delay measurement for one or more of a packet or a group of packets associated with the wireless communication in one or more of a downlink or an uplink. The operations of 1010 may be performed in accordance with examples as disclosed herein. In some examples, aspects of the operations of 1010 may be performed by a dynamic control signaling component 730 as described with reference to FIG. 7.

At 1015, the method may include determining a compensation value for the packet delay requirement based on the packet delay measurement for one or more of the packet or the group of packets associated with the wireless communication in one or more of the downlink or the uplink. The operations of 1015 may be performed in accordance with examples as disclosed herein. In some examples, aspects of the operations of 1015 may be performed by a compensation value component 745 as described with reference to FIG. 7.

At 1020, the method may include adjusting a packet delay parameter to compensate a delay for one or more of the downlink or the uplink based on the compensation value for the packet delay requirement. The operations of 1020 may be performed in accordance with examples as disclosed herein. In some examples, aspects of the operations of 1020 may be performed by a packet delay parameter component 735 as described with reference to FIG. 7.

At 1025, the method may include communicating in one or more of the downlink or the uplink based on the adjusted packet delay parameter. The operations of 1025 may be performed in accordance with examples as disclosed herein. In some examples, aspects of the operations of 1025 may be performed by a communications component 740 as described with reference to FIG. 7.

Figure 11:
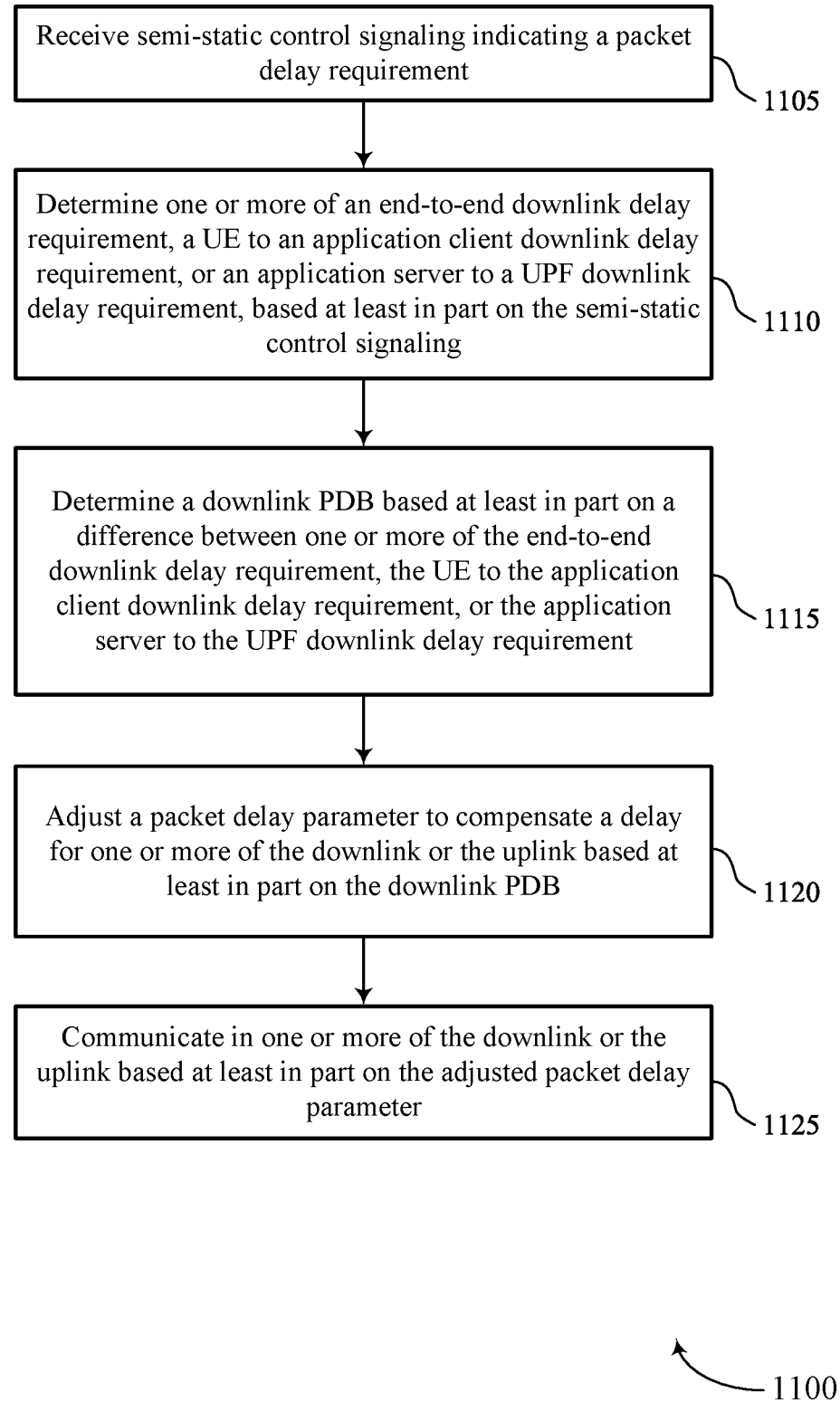

FIG. 11 shows a flowchart illustrating a method 1100 that supports managing an end-to-end delay budget for wireless communications in accordance with aspects of the present disclosure. The operations of the method 1100 may be implemented by a base station 105 or a UE 115 or its components (e.g., a delay manager) as described herein. In some examples, the operations of the method 1100 may be implemented by a delay manager or its components as described herein. For example, the operations of the method 1100 may be performed by a delay manager as described with reference to FIGS. 1 through 8. In some examples, a delay manager may execute a set of instructions to control the functional elements of the delay manager to perform the described functions. Additionally or alternatively, the delay manager may perform aspects of the described functions using special-purpose hardware.

At 1105, the method may include receiving semi-static control signaling indicating a packet delay requirement. The operations of 1105 may be performed in accordance with examples as disclosed herein. In some examples, aspects of the operations of 1105 may be performed by a semi-static control signaling component 725 as described with reference to FIG. 7.

At 1110, the method may include determining one or more of an end-to-end downlink delay requirement, a UE to an application client downlink delay requirement, or an application server to a UPF downlink delay requirement, based on the semi-static control signaling. The operations of 1110 may be performed in accordance with examples as disclosed herein. In some examples, aspects of the operations of 1110 may be performed by a downlink delay requirement component 750 as described with reference to FIG. 7.

At 1115, the method may include determining a downlink PDB based on a difference between one or more of the end-to-end downlink delay requirement, the UE to the application client downlink delay requirement, or the application server to the UPF downlink delay requirement. The operations of 1115 may be performed in accordance with examples as disclosed herein. In some examples, aspects of the operations of 1115 may be performed by a downlink delay budget component 755 as described with reference to FIG. 7.

At 1120, the method may include adjusting a packet delay parameter to compensate a delay for one or more of the downlink or the uplink based on the downlink PDB. The operations of 1120 may be performed in accordance with examples as disclosed herein. In some examples, aspects of the operations of 1120 may be performed by a packet delay parameter component 735 as described with reference to FIG. 7.

At 1125, the method may include communicating in one or more of the downlink or the uplink based on the adjusted packet delay parameter. The operations of 1125 may be performed in accordance with examples as disclosed herein. In some examples, aspects of the operations of 1125 may be performed by a communications component 740 as described with reference to FIG. 7.

Figure 12:
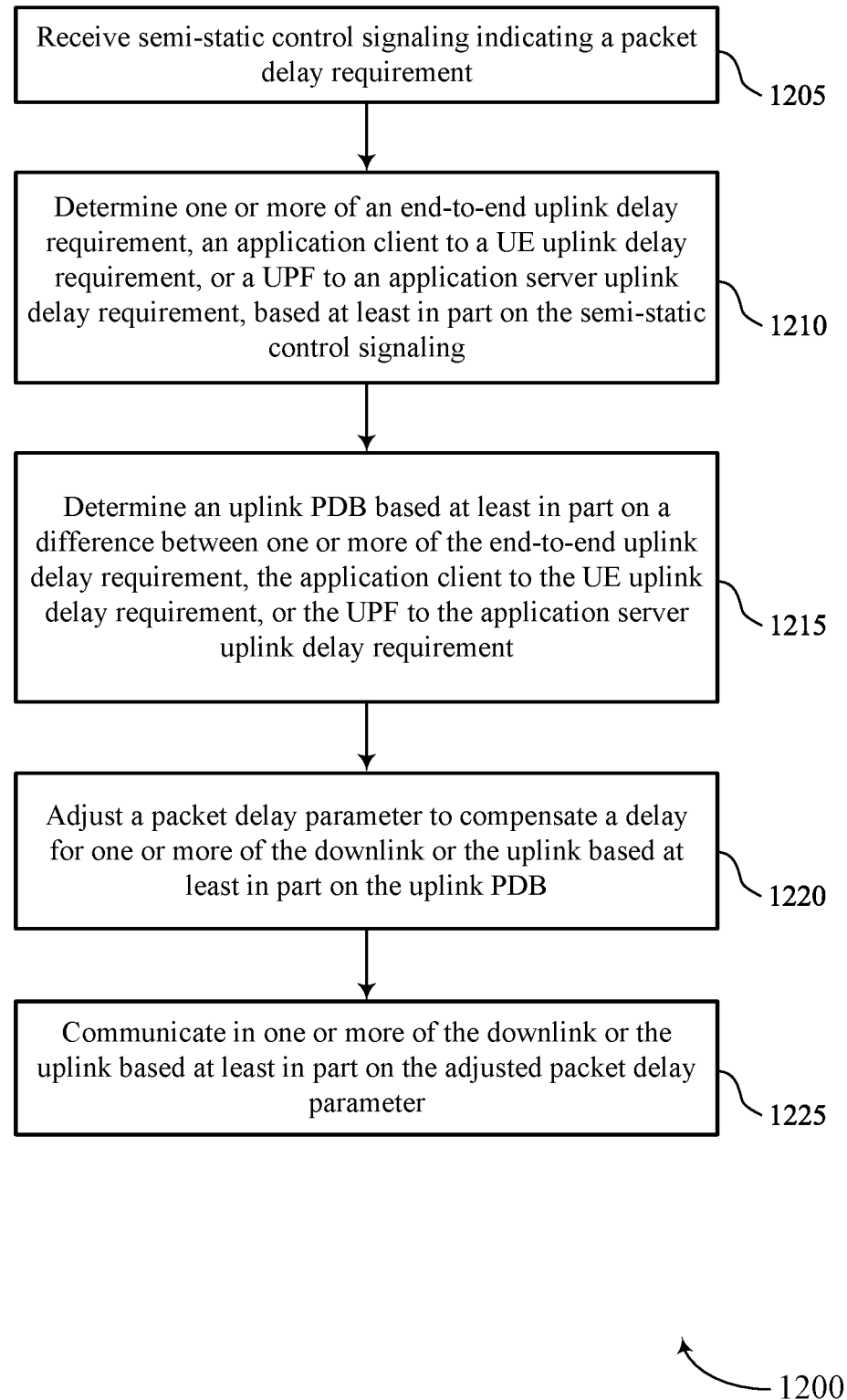

FIG. 12 shows a flowchart illustrating a method 1200 that supports managing an end-to-end delay budget for wireless communications in accordance with aspects of the present disclosure. The operations of the method 1200 may be implemented by a base station 105 or a UE 115 or its components (e.g., a delay manager) as described herein. In some examples, the operations of the method 1200 may be implemented by a delay manager or its components as described herein. For example, the operations of the method 1200 may be performed by a delay manager as described with reference to FIGS. 1 through 8. In some examples, a delay manager may execute a set of instructions to control the functional elements of the delay manager to perform the described functions. Additionally or alternatively, the delay manager may perform aspects of the described functions using special-purpose hardware.

At 1205, the method may include receiving semi-static control signaling indicating a packet delay requirement. The operations of 1205 may be performed in accordance with examples as disclosed herein. In some examples, aspects of the operations of 1205 may be performed by a semi-static control signaling component 725 as described with reference to FIG. 7.

At 1210, the method may include determining one or more of an end-to-end uplink delay requirement, an application client to a UE uplink delay requirement, or a UPF to an application server uplink delay requirement, based on the semi-static control signaling. The operations of 1210 may be performed in accordance with examples as disclosed herein. In some examples, aspects of the operations of 1210 may be performed by an uplink delay requirement component 760 as described with reference to FIG. 7.

At 1215, the method may include determining an uplink PDB based on a difference between one or more of the end-to-end uplink delay requirement, the application client to the UE uplink delay requirement, or the UPF to the application server uplink delay requirement. The operations of 1215 may be performed in accordance with examples as disclosed herein. In some examples, aspects of the operations of 1215 may be performed by an uplink delay budget component 765 as described with reference to FIG. 7.

At 1220, the method may include adjusting a packet delay parameter to compensate a delay for one or more of the downlink or the uplink based on the uplink PDB. The operations of 1220 may be performed in accordance with examples as disclosed herein. In some examples, aspects of the operations of 1220 may be performed by a packet delay parameter component 735 as described with reference to FIG. 7.

At 1225, the method may include communicating in one or more of the downlink or the uplink based on the adjusted packet delay parameter. The operations of 1225 may be performed in accordance with examples as disclosed herein. In some examples, aspects of the operations of 1225 may be performed by a communications component 740 as described with reference to FIG. 7.

The following provides an overview of aspects of the present disclosure:

Aspect 1: A method of wireless communication at a device, comprising: receiving semi-static control signaling indicating a packet delay requirement; receiving dynamic control signaling indicating a packet delay measurement for one or more of a packet or a group of packets associated with the wireless communication in one or more of a downlink or an uplink; adjusting a packet delay parameter to compensate a delay for one or more of the downlink or the uplink based at least in part on the packet delay requirement and the packet delay measurement; communicating in one or more of the downlink or the uplink based at least in part on the adjusted packet delay parameter.

Aspect 2: The method of aspect 1, further comprising: determining a compensation value for the packet delay requirement based at least in part on the packet delay measurement for one or more of the packet or the group of packets associated with the wireless communication in one or more of the downlink or the uplink, wherein adjusting the packet delay parameter is based at least in part on the compensation value for the packet delay requirement.

Aspect 3: The method of any of aspects 1 through 2, further comprising: determining one or more of an end-to-end downlink delay requirement, a user equipment to an application client downlink delay requirement, or an application server to a user plane function downlink delay requirement, based at least in part on the semi-static control signaling; and determining a downlink packet delay budget based at least in part on a difference between one or more of the end-to-end downlink delay requirement, the user equipment to the application client downlink delay requirement, or the application server to the user plane function downlink delay requirement, wherein adjusting the packet delay parameter is based at least in part on the downlink packet delay budget.

Aspect 4: The method of aspect 3, further comprising: receiving, from a user plane function, an indication of the packet delay measurement for one or more of the packet or the group of packets associated with the wireless communication in one or more of the downlink or the uplink based at least in part on a delay of one or more of the packet or the group of packets satisfying a threshold; and adjusting the downlink packet delay budget based at least in part on the delay of one or more of the packet or the group of packets satisfying the threshold, the threshold comprising the application server to the user plane function downlink delay requirement, wherein adjusting the packet delay parameter is based at least in part on the adjusted downlink packet delay budget.

Aspect 5: The method of aspect 3, further comprising: receiving, from the user equipment, an indication of the packet delay measurement for one or more of the packet or the group of packets associated with the wireless communication in one or more of the downlink or the uplink based at least in part on a delay of one or more of the packet or the group of packets satisfying a threshold; and adjusting the downlink packet delay budget based at least in part on the delay of one or more of the packet or the group of packets satisfying the threshold, the threshold comprising the end-to-end downlink delay requirement, wherein adjusting the packet delay parameter is based at least in part on the adjusted downlink packet delay budget.

Aspect 6: The method of any of aspects 1 through 5, further comprising: determining one or more of an end-to-end uplink delay requirement, an application client to a user equipment uplink delay requirement, or a user plane function to an application server uplink delay requirement, based at least in part on the semi-static control signaling; and determining an uplink packet delay budget based at least in part on a difference between one or more of the end-to-end uplink delay requirement, the application client to the user equipment uplink delay requirement, or the user plane function to the application server uplink delay requirement, wherein adjusting the packet delay parameter is based at least in part on the uplink packet delay budget.

Aspect 7: The method of aspect 6, further comprising: receiving, from a user equipment, an indication of the packet delay measurement for one or more of the packet or the group of packets associated with the wireless communication in one or more of the downlink or the uplink based at least in part on a delay of one or more of the packet or the group of packets satisfying a threshold; and adjusting the uplink packet delay budget based at least in part on the delay of one or more of the packet or the group of packets satisfying the threshold, the threshold comprising the application client to the user equipment uplink delay requirement, wherein adjusting the packet delay parameter is based at least in part on the adjusted uplink packet delay budget.

Aspect 8: The method of aspect 6, further comprising: receiving, from the user plane function, an indication of the packet delay measurement for one or more of the packet or the group of packets associated with the wireless communication in one or more of the downlink or the uplink based at least in part on a delay of one or more of the packet or the group of packets satisfying a threshold; and adjusting the uplink packet delay budget based at least in part on the delay of one or more of the packet or the group of packets satisfying the threshold, the threshold comprising a difference between the end-to-end uplink delay requirement and the user plane function to the application server uplink delay requirement, wherein adjusting the packet delay parameter is based at least in part on the adjusted uplink packet delay budget.

Aspect 9: The method of any of aspects 1 through 8, further comprising: determining one or more of an end-to-end downlink delay requirement, a downlink packet delay budget requirement, or an application server to a user plane function downlink delay requirement, based at least in part on the semi-static control signaling; and determining a user equipment to an application client downlink delay requirement based at least in part on a difference between one or more of the end-to-end downlink delay requirement, the downlink packet delay budget requirement, or the application server to the user plane function downlink delay requirement, wherein adjusting the packet delay parameter is based at least in part on the user equipment to the application client downlink delay requirement.

Aspect 10: The method of aspect 9, further comprising: performing the packet delay measurement for one or more of the packet or the group of packets associated with the wireless communication in one or more of the downlink or the uplink based at least in part on a delay of one or more of the packet or the group of packets satisfying a threshold; and adjusting the user equipment to the application client downlink delay requirement based at least in part on the delay of one or more of the packet or the group of packets satisfying the threshold, the threshold comprising one or more of the downlink packet delay budget requirement or the application server to the user plane function downlink delay requirement, wherein adjusting the packet delay parameter is based at least in part on the adjusting of the user equipment to the application client downlink delay requirement.

Aspect 11: The method of aspect 9, further comprising: receiving, from an application client, an indication of the packet delay measurement for one or more of the packet or the group of packets associated with the wireless communication in one or more of the downlink or the uplink based at least in part on a delay of one or more of the packet or the group of packets satisfying a threshold; and adjusting the user equipment to the application client downlink delay requirement based at least in part on the delay of one or more of the packet or the group of packets satisfying the threshold, the threshold comprising the end-to-end downlink delay requirement, wherein adjusting the packet delay parameter is based at least in part on the adjusting of the user equipment to the application client downlink delay requirement.

Aspect 12: The method of any of aspects 1 through 11, further comprising: determining one or more of an end-to-end uplink delay requirement, an uplink packet delay budget requirement, or a user plane function to an application server uplink delay requirement, based at least in part on the semi-static control signaling; and determining a user equipment to an application server uplink delay requirement based at least in part on a difference between one or more of the end-to-end uplink delay requirement, the uplink packet delay budget requirement, or the user plane function to the application server uplink delay requirement, wherein adjusting the packet delay parameter is based at least in part on the user equipment to an application server uplink delay requirement.

Aspect 13: The method of aspect 12, further comprising: receiving, from a base station an indication, of the packet delay measurement for one or more of the packet or the group of packets associated with the wireless communication in one or more of the downlink or the uplink based at least in part on a delay of one or more of the packet or the group of packets satisfying a threshold; adjusting the user equipment to an application server uplink delay requirement based at least in part on the delay of one or more of the packet or the group of packets satisfying the threshold, the threshold comprising the uplink packet delay budget requirement, wherein adjusting the packet delay parameter is based at least in part on the adjusting of the user equipment to an application server uplink delay requirement.

Aspect 14: The method of any of aspects 1 through 13, further comprising: determining a nominal packet delay requirement decoupled from the device based at least in part on the semi-static control signaling, wherein adjusting the packet delay parameter is based at least in part on the nominal packet delay requirement decoupled from the device.

Aspect 15: The method of any of aspects 1 through 14, further comprising: determining a nominal packet delay requirement coupled to the device based at least in part on the semi-static control signaling, wherein adjusting the packet delay parameter is based at least in part on the nominal packet delay requirement coupled to the device.

Aspect 16: The method of any of aspects 1 through 15, wherein the semi-static control signaling comprises an RRC message.

Aspect 17: The method of any of aspects 1 through 16, wherein the dynamic control signaling comprises a DCI or a medium access control-control element (MAC-CE).

Aspect 18: The method of any of aspects 1 through 17, wherein the device comprises a UE or a base station.

Aspect 19: An apparatus comprising a processor; memory coupled with the processor; and instructions stored in the memory and executable by the processor to cause the apparatus to perform a method of any of aspects 1 through 18.

Aspect 20: An apparatus comprising at least one means for performing a method of any of aspects 1 through 18.

Aspect 21: A non-transitory computer-readable medium storing code the code comprising instructions executable by a processor to perform a method of any of aspects 1 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a device, comprising:

receiving, from a first device different than the device, semi-static control signaling indicating a set of packet delay requirements comprising at least:

downlink delay requirements comprising an end-to-end downlink delay requirement, a downlink packet delay budget requirement, and an application server to a user plane function downlink delay requirement, wherein a user equipment to the application client downlink delay requirement is based at least in part on a difference between one or more of the downlink delay requirements, or uplink delay requirements comprising an end-to-end uplink delay requirement, an uplink packet delay budget requirement, and a user plane function to an application server uplink delay requirement, wherein a user equipment to the application server uplink delay requirement is based at least in part on a difference between one or more of the uplink delay requirements;

receiving, from a second device different than the device, dynamic control signaling indicating a packet delay measurement for one or more of a packet or a group of packets associated with the wireless communication in one or more of a downlink or an uplink;

adjusting a packet delay parameter to compensate a delay for one or more of the downlink or the uplink based at least in part on the user equipment to the application client downlink delay requirement, the user equipment to the application server uplink delay requirement, and the packet delay measurement; and communicating in one or more of the downlink or the uplink based at least in part on the adjusted packet delay parameter.

2. The method of claim 1, further comprising:

determining a compensation value for one or more packet delay requirements of the set of packet delay requirements based at least in part on the packet delay measurement for one or more of the packet or the group of packets associated with the wireless communication in one or more of the downlink or the uplink, wherein the one or more packet delay requirements include the user equipment to the application client downlink delay requirement and the user equipment to the application server uplink delay requirement, wherein adjusting the packet delay parameter is based at least in part on the compensation value for the one or more packet delay requirements.

3. The method of claim 1, further comprising:
determining one or more of the end-to-end downlink delay requirement, the user equipment to the application client downlink delay requirement, or the application server to the user plane function downlink delay requirement, based at least in part on the semi-static control signaling; and
determining a downlink packet delay budget based at least in part on a difference between one or more of the end-to-end downlink delay requirement, the user equipment to the application client downlink delay requirement, or the application server to the user plane function downlink delay requirement,
wherein adjusting the packet delay parameter is based at least in part on the downlink packet delay budget.

4. The method of claim 3, further comprising:
receiving, from the user plane function, an indication of the packet delay measurement for one or more of the packet or the group of packets associated with the wireless communication in one or more of the downlink or the uplink based at least in part on a delay of one or more of the packet or the group of packets satisfying a threshold; and
adjusting the downlink packet delay budget based at least in part on the delay of one or more of the packet or the group of packets satisfying the threshold, the threshold comprising the application server to the user plane function downlink delay requirement,
wherein adjusting the packet delay parameter is based at least in part on the adjusted downlink packet delay budget.

5. The method of claim 3, further comprising:
receiving, from a user equipment (UE), an indication of the packet delay measurement for one or more of the packet or the group of packets associated with the wireless communication in one or more of the downlink or the uplink based at least in part on a delay of one or more of the packet or the group of packets satisfying a threshold; and
adjusting the downlink packet delay budget based at least in part on the delay of one or more of the packet or the group of packets satisfying the threshold, the threshold comprising the end-to-end downlink delay requirement,
wherein adjusting the packet delay parameter is based at least in part on the adjusted downlink packet delay budget.

6. The method of claim 1, further comprising:
determining one or more of the end-to-end uplink delay requirement, an application client to the user equipment uplink delay requirement, or the user plane function to the application server uplink delay requirement, based at least in part on the semi-static control signaling; and
determining an uplink packet delay budget based at least in part on a difference between one or more of the end-to-end uplink delay requirement, the application client to the user equipment uplink delay requirement, or the user plane function to the application server uplink delay requirement,
wherein adjusting the packet delay parameter is based at least in part on the uplink packet delay budget.

7. The method of claim 6, further comprising:
receiving, from a user equipment (UE), an indication of the packet delay measurement for one or more of the packet or the group of packets associated with the wireless communication in one or more of the downlink or the uplink based at least in part on a delay of one or more of the packet or the group of packets satisfying a threshold; and
adjusting the uplink packet delay budget based at least in part on the delay of one or more of the packet or the group of packets satisfying the threshold, the threshold comprising the application client to the user equipment uplink delay requirement,
wherein adjusting the packet delay parameter is based at least in part on the adjusted uplink packet delay budget.

8. The method of claim 6, further comprising:
receiving, from the user plane function, an indication of the packet delay measurement for one or more of the packet or the group of packets associated with the wireless communication in one or more of the downlink or the uplink based at least in part on a delay of one or more of the packet or the group of packets satisfying a threshold; and
adjusting the uplink packet delay budget based at least in part on the delay of one or more of the packet or the group of packets satisfying the threshold, the threshold comprising a difference between the end-to-end uplink delay requirement and the user plane function to the application server uplink delay requirement,
wherein adjusting the packet delay parameter is based at least in part on the adjusted uplink packet delay budget.

9. The method of claim 1, further comprising:
performing the packet delay measurement for one or more of the packet or the group of packets associated with the wireless communication in one or more of the downlink or the uplink based at least in part on a delay of one or more of the packet or the group of packets satisfying a threshold; and
adjusting the user equipment to the application client downlink delay requirement based at least in part on the delay of one or more of the packet or the group of packets satisfying the threshold, the threshold comprising one or more of the downlink packet delay budget requirement or the application server to the user plane function downlink delay requirement,
wherein adjusting the packet delay parameter is based at least in part on the adjusting of the user equipment to the application client downlink delay requirement.

10. The method of claim 1, further comprising:
receiving, from an application client, an indication of the packet delay measurement for one or more of the packet or the group of packets associated with the wireless communication in one or more of the downlink or the uplink based at least in part on a delay of one or more of the packet or the group of packets satisfying a threshold; and
adjusting the user equipment to the application client downlink delay requirement based at least in part on the delay of one or more of the packet or the group of packets satisfying the threshold, the threshold comprising the end-to-end downlink delay requirement,
wherein adjusting the packet delay parameter is based at least in part on the adjusting of the user equipment to the application client downlink delay requirement.

11. The method of claim 1, further comprising:
receiving, from a network device an indication, of the packet delay measurement for one or more of the packet or the group of packets associated with the wireless communication in one or more of the downlink or the uplink based at least in part on a delay of one or more of the packet or the group of packets satisfying a threshold; and adjusting the user equipment to the application server uplink delay requirement based at least in part on the delay of one or more of the packet or the group of packets satisfying the threshold, the threshold comprising the uplink packet delay budget requirement, wherein adjusting the packet delay parameter is based at least in part on the adjusting of the user equipment to the application server uplink delay requirement.

12. The method of claim 1, further comprising:
determining a nominal packet delay requirement decoupled from the device based at least in part on the semi-static control signaling,
wherein adjusting the packet delay parameter is based at least in part on the nominal packet delay requirement decoupled from the device.

13. The method of claim 1, further comprising:
determining a nominal packet delay requirement coupled to the device based at least in part on the semi-static control signaling,
wherein adjusting the packet delay parameter is based at least in part on the nominal packet delay requirement coupled to the device.

14. The method of claim 1, wherein the semi-static control signaling comprises a radio resource control (RRC) message.

15. The method of claim 1, wherein the dynamic control signaling comprises a downlink control information (DCI) or a medium access control-control element (MAC-CE).

16. The method of claim 1, wherein the device comprises a user equipment (UE) or a network device.

17. An apparatus for wireless communication, comprising: a processor;
memory coupled with the processor; and
instructions stored in the memory and executable by the processor to cause the apparatus to:
receive, from a first device, semi-static control signaling indicating a set of packet delay requirements comprising at least:
downlink delay requirements comprising an end-to-end downlink delay requirement, a downlink packet delay budget requirement, and an application server to a user plane function downlink delay requirement, wherein a user equipment to the application client downlink delay requirement is based at least in part on a difference between one or more of the downlink delay requirements, or
uplink delay requirements comprising an end-to-end uplink delay requirement, an uplink packet delay budget requirement, and a user plane function to an application server uplink delay requirement, wherein a user equipment to the application server uplink delay requirement is based at least in part on a difference between one or more of the uplink delay requirements;
receive, from a second device, dynamic control signaling indicating a packet delay measurement for one or more of a packet or a group of packets associated with the wireless communication in one or more of a downlink or an uplink;
adjust a packet delay parameter to compensate a delay for one or more of the downlink or the uplink based at least in part on the user equipment to the application client downlink delay requirement, the user equipment to the application server uplink delay requirement, and the packet delay measurement; and
communicate in one or more of the downlink or the uplink based at least in part on the adjusted packet delay parameter.

18. An apparatus for wireless communication, comprising:
means for receiving, from a first device, semi-static control signaling indicating a set of packet delay requirements comprising at least:
downlink delay requirements comprising an end-to-end downlink delay requirement, a downlink packet delay budget requirement, and an application server to a user plane function downlink delay requirement, wherein a user equipment to the application client downlink delay requirement is based at least in part on a difference between one or more of the downlink delay requirements, or uplink delay requirements comprising an end-to-end uplink delay requirement, an uplink packet delay budget requirement, and a user plane function to an application server uplink delay requirement, wherein a user equipment to the application server uplink delay requirement is based at least in part on a difference between one or more of the uplink delay requirements;
means for receiving, from a second device, dynamic control signaling indicating a packet delay measurement for one or more of a packet or a group of packets associated with the wireless communication in one or more of a downlink or an uplink;
means for adjusting a packet delay parameter to compensate a delay for one or more of the downlink or the uplink based at least in part on the user equipment to the application client downlink delay requirement, the user equipment to the application server uplink delay requirement, and the packet delay measurement; and
means for communicating in one or more of the downlink or the uplink based at least in part on the adjusted packet delay parameter.

* * * * *